(12) United States Patent
Jeon

(10) Patent No.: US 9,390,715 B2
(45) Date of Patent: Jul. 12, 2016

(54) MOBILE TERMINAL AND CONTROLLING METHOD FOR DISPLAYING A WRITTEN TOUCH INPUT BASED ON A RECOGNIZED INPUT VOICE

(71) Applicant: LG ELECTRONICS INC., Seoul (KR)

(72) Inventor: Hyunjoo Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 113 days.

(21) Appl. No.: 14/272,233

(22) Filed: May 7, 2014

(65) Prior Publication Data

US 2015/0081291 A1 Mar. 19, 2015

(30) Foreign Application Priority Data

Sep. 17, 2013 (KR) ........................ 10-2013-0112042

(51) Int. Cl.
| | |
|---|---|
| *G10L 15/26* | (2006.01) |
| *G06F 3/16* | (2006.01) |
| *G06F 3/041* | (2006.01) |
| *G10L 15/24* | (2013.01) |
| *G06F 3/038* | (2013.01) |
| *G06F 17/24* | (2006.01) |

(52) U.S. Cl.
CPC ................ *G10L 15/26* (2013.01); *G06F 3/038* (2013.01); *G06F 3/0416* (2013.01); *G06F 3/167* (2013.01); *G06F 17/242* (2013.01); *G10L 15/24* (2013.01)

(58) Field of Classification Search
CPC ....... G06F 3/167; G06F 3/0416; G06F 3/038; G06F 17/21; G10L 15/26; G10L 15/24; G06K 9/629
USPC ........................................................ 704/235
See application file for complete search history.

(56) References Cited

U.S. PATENT DOCUMENTS

| | | | | |
|---|---|---|---|---|
| 6,438,523 B1* | 8/2002 | Oberteuffer | ............ | G06F 3/038 382/186 |
| 7,292,986 B1* | 11/2007 | Venolia | ................... | G10L 15/22 704/270 |
| 8,806,384 B2* | 8/2014 | Bi | ........................ | G06F 3/04886 345/173 |
| 2003/0233237 A1* | 12/2003 | Garside | ................... | G06F 3/038 704/270 |
| 2010/0023312 A1* | 1/2010 | Heath | ................. | G06F 17/2211 704/2 |
| 2011/0307822 A1* | 12/2011 | Park | .................... | G06F 3/04883 715/773 |
| 2012/0324324 A1* | 12/2012 | Hwang | .................... | G09B 5/06 715/203 |
| 2013/0191122 A1* | 7/2013 | Mason | .............. | G06F 17/30017 704/231 |
| 2013/0332162 A1* | 12/2013 | Keen | ....................... | G10L 15/26 704/235 |
| 2014/0136450 A1* | 5/2014 | Lee | ........................ | G06N 7/005 706/11 |
| 2014/0253478 A1* | 9/2014 | Jeong | ...................... | G06F 3/016 345/173 |
| 2016/0048372 A1* | 2/2016 | Ozcan | ..................... | G06F 3/167 715/728 |

* cited by examiner

*Primary Examiner* — Tammy Pham
*Assistant Examiner* — Edwin S Leland, III
(74) *Attorney, Agent, or Firm* — Birch, Stewart, Kolasch & Birch, LLP

(57) ABSTRACT

A mobile terminal including a wireless communication unit configured to perform wireless communication; a microphone configured to receive an input voice; a touch screen; and a controller configured to receive a written touch input on the touch screen corresponding to the input voice, recognize the input voice while a voice recognition mode is activated, and display extracted information extracted from the recognized input voice on the touch screen based on a comparison of the recognized input voice and the written input.

20 Claims, 15 Drawing Sheets

MOBILE TERMINAL AND CONTROLLING METHOD FOR DISPLAYING A WRITTEN TOUCH INPUT BASED ON A RECOGNIZED INPUT VOICE

CROSS-REFERENCE TO RELATED APPLICATION

Pursuant to 35 U.S.C. §119(a), this application claims the benefit of earlier filing date and right of priority to Korean Application No. 10-2013-0112042, filed on Sep. 17, 2013, the contents of which is incorporated by reference herein in its entirety.

BACKGROUND OF THE INVENTION

1. Field of the Invention

The present invention relates to a mobile terminal for displaying voice-recognized letters on a display unit and a method of controlling the mobile terminal.

2. Background of the Invention

A terminal is broadly categorized into a mobile terminal and a stationary terminal. The mobile terminal is further categorized by portability into a handheld terminal and a vehicle-mounted terminal.

In response to an increasing demand for diversified functions, the terminal operates as a multimedia player with multiple functions such as shooting a photographic object as a still image or moving images, reproducing digital audio and video compression files, playing a game, receiving a broadcast or the like.

In addition, the mobile terminal attempts to recognize content of a telephone conversation or external voice generated and utilizing the recognized content and generated voice in various ways. For example, a message can be created by executing a speech-to-text (SST) function in which the content of the telephone conversation or the voice generated from the outside is converted into text.

However, it takes a long time for the user to input the content of the telephone conversation or the entire content of the generated voice by executing only the SST function. In addition, it is difficult for the user to easily recognize an important portion, either of the content of the telephone conversation and the content of the generated voice.

SUMMARY OF THE INVENTION

Therefore, an aspect of the detailed description is to provide a mobile terminal for efficiently using a writing-input portion when converting a voice input through a microphone into text and a method of controlling the mobile terminal.

To achieve these and other advantages and in accordance with the purpose of this specification, as embodied and broadly described herein, there is provided a mobile terminal including a microphone into which a voice is input, a display unit which is configured to be touchable for writing input and to which the writing input of at least one portion of the voice input with a touch is output, and a controller that, when a voice recognition mode is activated, recognizes the voice input, compares content that is voice-recognized, with the writing input that is output to the display unit, and controls the display unit so input-recommended information including information relating to the content that is voice-recognized and the writing input is output as a result of the comparison.

In the mobile terminal, among the letters that are voice-recognized, the input-recommended information may include at least one or more of positional information on the writing-input letters, correction information on the writing-input letters, information on remaining letters excluding the writing-input letters, and marking information for distinguishing the writing-input letters from the remaining letters excluding the writing-input letters.

In the mobile terminal, the controller can convert the letters that are voice-recognized, into text in sentence units, and may make the result of the conversion pops up on one region of the display unit so the result of the conversion does not overlap the writing input, and when the popping-up sentence is selected, the controller can perform control so at least one portion of the selected sentence is inserted into a region to which the writing input is output, based on the input-recommended information.

Further, when at least one portion of the selected sentence is inserted, the controller can replace writing-input letters that are output to the display unit with letters in the selected sentence, and may control the display unit so the replacement letters are distinguished from the other letters in the selected sentence.

In addition, the controller can perform control so the replacement letters are changed in a different shape from a shape of the other letters in the selected sentence or a highlighting effect is output to the replacement letters.

In the mobile terminal, when it is determined that a space for the writing input is insufficient on the display unit, or when it is detected that the touch input in a second direction is applied to the display unit, the controller can control the display unit so a memo space is secured by adjusting sizes of the already-input letters.

In the mobile terminal, when it is determined that a space for the writing input is insufficient on the display unit, or when it is detected that the touch input in a second direction is applied to the display unit, the controller can control the display unit so a new page is displayed while a page-turning effect is output.

In the mobile terminal, when a picture image is included in the writing input, in response to the selection of the popping-up sentence, the controller can detect an emoticon that is similar in shape to the picture image through a search of a memory, replace the picture image with the detected emoticon, and display the detected emoticon to the display unit.

The mobile terminal may further include a user input unit that is configured to receive a control command, as an input, for executing either of two modes, a first screen mode and an a second screen mode that differ depending on whether or not the voice-recognized letters is added to the writing input, in which the controller can perform the control so in the first screen mode, only the writing input associated with at least one portion of the voice input is output to the display unit and in the second screen mode, a screen in which the writing input associated with the at least one portion of the voice input and at least one portion of the letters that are voice-recognized are added to the writing input is output to the display unit.

In the mobile terminal, the user input unit may be configured to receive a control command for playing back a recoding according to the voice input, and when the control command for playing back the recording is input when a screen corresponding to either of the first and second screen modes, the controller can control the display unit so the screen that is output is scrolled according to a speed at which the recorded voice is played back.

In the mobile terminal, when a screen corresponding to either of the first and second screen modes is output, when it is detected that a predetermined touch input is applied to the screen that is output, the controller can enter an edit mode and may output an indicator indicating an input position to a point at which the touch input is detected.

In the mobile terminal, when the voice recognition mode is changed to an inactivated state or recording of the voice input is finished, the controller can control the display unit so a list of letters that are addable to the writing input is output based on the generated input information.

In the mobile terminal, when it is detected that a first touch is applied to specific letters in the list, the controller can add the specific letters to the writing input, and when it is detected that a second touch is applied to the added specific letters, the controller can arrange the specific letters at a point at which drag of the second touch is terminated.

In the mobile terminal, when an automatic input function is selected when the voice recognition mode is activated, the controller can convert the letters that are voice-recognized, into text in constant units and may add in real time the text that results from the conversion to a region to which the writing input is output, based on the input-recommended information.

In the mobile terminal, when a first control command is detected when a screen of the writing input corresponding to a first application is output to the display unit, the controller can perform control so the screen of the writing input is switched to an execution screen corresponding to a second application and a graphic object indicating that recording of the voice input is in progress is output to one region of the display unit.

In the mobile terminal, when it is detected that a predetermined-type touch input is applied to the graphic object, the controller can output the screen of the writing input corresponding to the first application back to the display unit and may insert text letters corresponding to the voice that is automatically recorded while the execution screen corresponding to the second application is output, into a region to which the writing input is output.

In the mobile terminal, when it is determined that a speed of the writing input that is applied to the display unit is lower by a predetermined range or above than an input speed of the voice, the controller can perform control so an automatic input function in which the letters that are voice-recognized are converted into text and the text that results from the conversion is added in real time to a region to which the writing input is output is executed.

The mobile terminal may further include a user input unit that is configured to receive a control command, as an input, for executing an additional search associated with the voice input, in which when the control command for executing the additional search is input, the controller can analyze the voice input, searches a memory of a main body or conducts a web search for a voice file that is the same as the voice input, in terms of a voice generator, and output a list of voice files that results from the search to the display unit.

In the mobile terminal, in response to the finishing of an additional input based on the writing input and the input-recommended information, the controller can generate at least one voice memo file and output an icon corresponding to the generated voice memo file to one region of the display unit.

In the mobile terminal, in response to the dragging of the touches applied to two touch starting points on multiple icons corresponding to the multiple voice memo files in a first direction, the controller can combine the multiple icons, combine the multiple voice memo files, each corresponding to the icon, which that are present between the multiple icons, and output a first icon indicating the combination voice memo file to the display unit.

To achieve these and other advantages and in accordance with the purpose of this specification, as embodied and broadly described herein, there is provided a method of controlling a mobile terminal, including inputting a voice through a microphone provided in a main body, outputting writing input corresponding to a touch that is applied to a display unit of the main body, with respect to at least one portion of the voice input, recognizing the voice input when a voice recognition mode is activated, and comparing content that is voice-recognized, with the writing input that is output to the display unit, and outputting input-recommended information including information relating to the content that is voice-recognized and the writing input, as a result of the comparison.

In the method, among the letters that are voice-recognized, the input-recommended information may include at least one or more of positional information on the writing-input letters, correction information on the writing-input letters, information on remaining letters excluding the writing-input letters, and marking information for distinguishing the writing-input letters from the remaining letters excluding the writing-input letters.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail of the embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function.

A terminal in the present description includes a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, the present invention may be also applicable to a fixed terminal such as a digital TV and a desktop computer, except for specific configurations for mobility.

Figure 1:
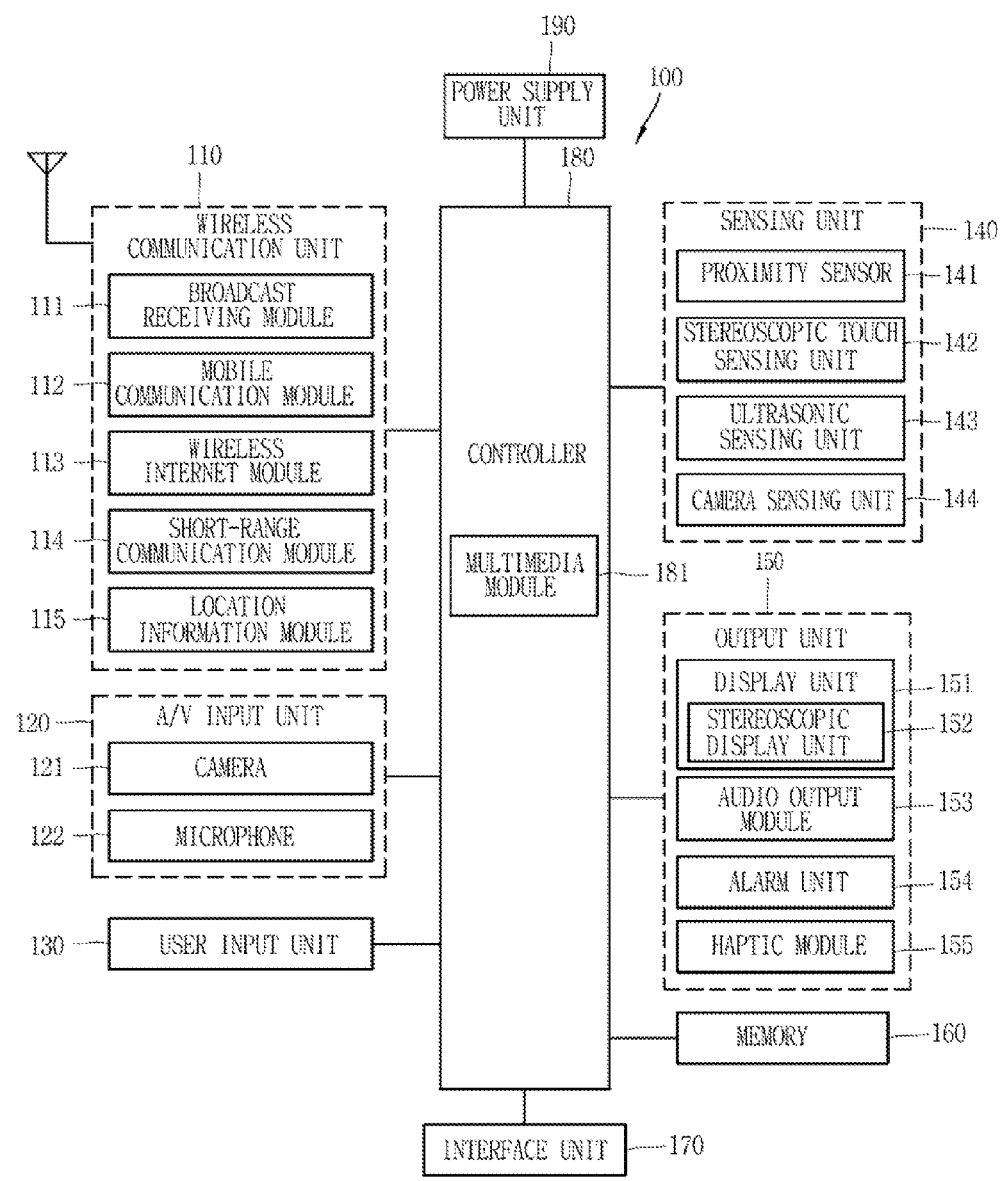
FIG. 1 is a block diagram illustrating a mobile terminal according to one embodiment of the present invention.

FIG. 1 is a block diagram of a mobile terminal 100 in accordance with one embodiment. The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but implementing all of the illustrated components is not a requirement. Greater or fewer components may alternatively be implemented.

Hereinafter, each component is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the display device. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems. Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external display device, a server, etc.) on a mobile communication network. Further, the wireless signals may include audio call signal, video (telephony) call signal, or various formats of data according to transmission/reception of text/multimedia messages.

The mobile communication module 112 may implement a video call mode and a voice call mode. The video call mode indicates calling while watching an image of the caller. The voice call mode indicates calling a person without watching the person's image. The wireless communication module 112 may transmit and receive at least one of voice and image in order to implement the video call mode and the voice call mode.

The wireless Internet module 113 supports wireless Internet access for the display device. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a display device. An example of the location information module 115 may include a Global Position System (GPS) module.

Still referring to FIG. 1, the A/V input unit 120 is configured to provide audio or video signal input to the display device. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the display device.

The microphone 122 may receive an external audio signal while the display device is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the display device. The user input unit 130 may include a keypad, a dome switch, a touchpad (e.g., static pressure/capacitance), a jog wheel, a jog switch and the like.

The sensing unit 140 provides status measurements of various aspects of the display device. For instance, the sensing unit 140 can detect an open/close status of the display device, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type display device, the sensing unit 140 can sense whether a sliding portion of the display device is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, a stereoscopic display unit 152, an audio output module 153, an alarm unit 154 and a haptic module 155.

The display unit 151 may output information processed in the mobile terminal 100. For example, when the display device is operating in a phone call mode, the display unit 151 will provide a User Interface (UI) or a Graphic User Interface (GUI), which includes information associated with the call. As another example, if the display device is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit 152 for displaying stereoscopic images. Further, the stereoscopic image may be a three-dimensional (3D) stereoscopic image, and the 3D stereoscopic image is an image refers to an image making a viewer feel that a gradual depth and reality of an object on a monitor or a screen is the same as a reality space.

In more detail, a 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image includes a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

As illustrated, a left image and a right image required for implementing a 3D stereoscopic image is displayed on the stereoscopic display unit 152 by a stereoscopic processing unit (not shown). The stereoscopic processing unit may receive the 3D image and extract the left image and the right image, or may receive the 2D image and change it into a left image and a right image.

Further, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Further, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 can sense which region of the display unit 151 has been touched.

Still referring to FIG. 1, t proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves.

The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of the camera 121, a photo sensor, and a laser sensor. For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In more detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 153 can convert and output as sound audio data received from the wireless communication unit 110 or stored in the memory 160 in a call signal reception mode, a call mode, a record mode, a voice recognition mode, a broadcast reception mode, and the like. Also, the audio output module 153 may provide audible outputs related to a particular function performed by the mobile terminal 100 (e.g., a call signal reception sound, a message reception sound, etc.). The audio output module 153 may include a speaker, a buzzer or the like.

The alarm unit 154 outputs a signal for informing about an occurrence of an event of the mobile terminal 100. Events generated in the display device may include call signal reception, message reception, key signal inputs, a touch input etc. In addition to video or audio signals, the alarm unit 154 may output signals in a different manner, for example, using vibration to inform about an occurrence of an event. The video or audio signals may be also output via the audio output module 153, so the display unit 151 and the audio output module 153 may be classified as parts of the alarm unit 154.

A haptic module 155 generates various tactile effects the user may feel. A typical example of the tactile effects generated by the haptic module 155 is vibration. The strength and pattern of the haptic module 155 can be controlled. For example, different vibrations may be combined to be output or sequentially output.

Besides vibration, the haptic module 155 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 155 may be implemented to allow the user to feel a tactile effect through a muscle sensation such as fingers or arm of the user, as well as transferring the tactile effect through a direct contact. Two or more haptic modules 155 may be provided according to the configuration of the mobile terminal 100.

The memory 160 may store software programs used for the processing and controlling operations performed by the controller 180, or may temporarily store data (e.g., a phonebook, messages, still images, video, etc.) that are input or output. In addition, the memory 160 may store data regarding various patterns of vibrations and audio signals output when a touch is input to the touch screen.

The memory 160 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the display device therethrough. Various command signals or power input from the cradle may operate as signals for recognizing that the display device is properly mounted on the cradle.

The controller 180 typically controls the general operations of the display device. For example, the controller 180 performs controlling and processing associated with voice calls, data communications, video calls, and the like. The controller 180 can include a multimedia module 181 for reproducing multimedia data. The multimedia module 181 may be configured within the controller 180 or may be configured to be separated from the controller 180.

The controller 180 can perform a pattern recognition processing to recognize a handwriting input or a picture drawing input performed on the touch screen as characters or images, respectively.

Also, the controller 180 can execute a lock state to restrict a user from inputting control commands for applications when a state of the display device meets a preset condition. Also, the controller 180 can control a lock screen displayed in the lock state based on a touch input sensed on the display unit 151 in the lock state of the display device.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented by the controller 180 itself.

For a software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Hereinafter, a structure of the mobile terminal of FIG. 1 according to an embodiment of the present invention will be explained.

Figure 2A:
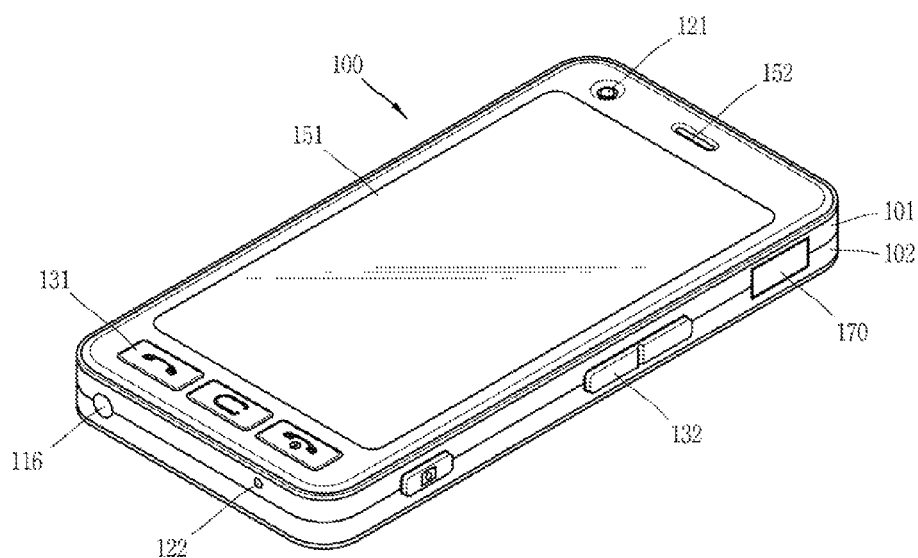
FIGS. 2A and 2B are perspective views, each illustrating the mobile terminal according to one embodiment of the present invention when viewed from the front side and from the rear side, respectively.
Figure 2B:
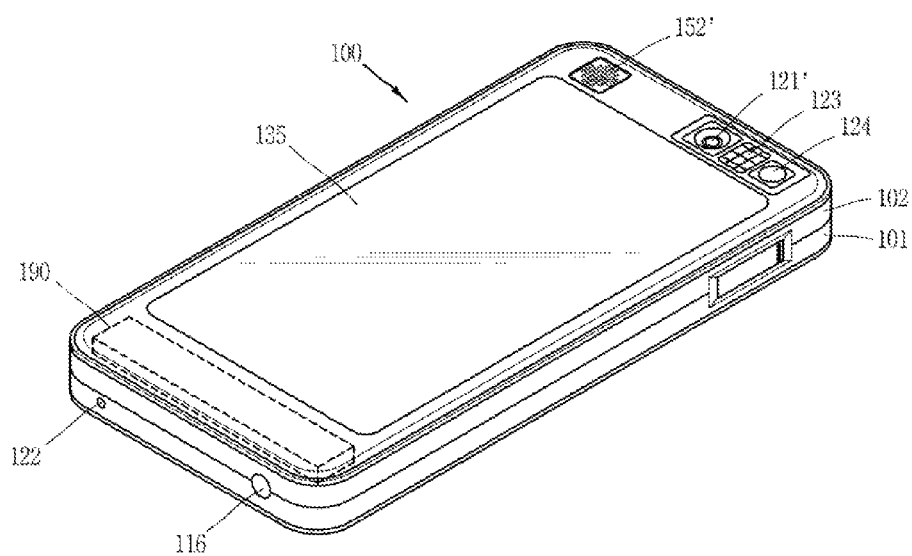

FIG. 2A is a front perspective view of the mobile terminal according to an embodiment of the present invention, and FIG. 2B is a rear perspective view of the mobile terminal according to an embodiment of the present invention The mobile terminal 100 according to an embodiment the present invention is a bar type mobile terminal. However, the present invention is not limited to this, but may be applied to a slide type in which two or more bodies are coupled to each other so as to perform a relative motion, a folder type, or a swing type, a swivel type and the like.

A body of the mobile terminal 100 has a front surface, side surfaces and a rear surface. The body has two ends in a lengthwise direction. A case (casing, housing, cover, etc.) forming an outer appearance of the body 100 may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti). At the front case 101, may be disposed a display unit 151, an audio output unit 152, a camera 121, user input units 130/131 and 132, a microphone 122, an interface unit 170, etc.

The display 151 occupies most parts of a main surface of the front case 101. The audio output unit 152 and the camera 121 are arranged at a region adjacent to one end of the stereoscopic display 151, and the user input unit 131 and the microphone 122 are arranged at a region adjacent to another end of the display 151. The user input unit 131, the interface unit 170, etc. may be arranged on side surfaces of the front case 101 and the rear case 102. The microphone 122 is disposed at another end of the body 100.

The user input unit 130 is manipulated to receive a command for controlling the operation of the mobile terminal 100, and may include a plurality of manipulation units 131 and 132. The manipulation units may be referred to as manipulating portions, and may include any type of ones that can be manipulated in a user's tactile manner.

Commands input through the first or second user input units 131 and 132 may be variously set. For instance, the first manipulation 131 is configured to input commands such as START, END, SCROLL or the like, and the second manipulation unit 132 is configured to input commands for controlling a level of sound output from the audio output unit 152, or commands for converting the current mode of the display 151 to a touch recognition mode.

Referring to FIG. 2B, an audio output unit 152' may be additionally disposed at the rear case 102. The audio output unit 152' may implement a stereo function together with the audio output unit 152 (refer to FIG. 2A), and may be used for calling in a speaker phone mode.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display 151, the touch pad 135 may be formed to be light-transmissive. In this instance, if the display 151 is configured to output visual information from two surfaces thereof, the visual information can be recognized through the touch pad 135. The information output from the two surfaces can be controlled by the touch pad 135. Alternatively, a display may be additionally mounted to the touch pad 135, so that a touch screen can be disposed at the rear case 102.

A camera 121' may be additionally provided on the rear case 102. The camera 121' faces a direction which is opposite to a direction faced by the camera 121 (refer to FIG. 2A), and may have different pixels from the camera 121.

For example, the camera 121 may operate with relatively lower pixels (lower resolution). Thus, the camera 121 may be useful when a user can capture his face and send it to another party during a video call or the like. In addition, the camera 121' may operate with a relatively higher pixels (higher resolution) such that it can be useful for a user to obtain higher quality pictures for later use. The cameras 121 and 121' may be installed at the body 100 so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 252' may be additionally arranged on a rear surface of the body. The audio output unit 252' (refer to FIG. 2A) may cooperate with the audio output unit 252 (refer to FIG. 2A) so as to implement a stereo function. Also, the audio output unit may be configured to operate as a speakerphone.

A power supply unit 190 for supplying power to the mobile terminal 100 is mounted to the body. The power supply unit 190 may be mounted in the body, or may be detachably mounted to the body.

The touch pad 135 operates in association with the display 151 of the front case 101. The touch pad 135 may be disposed on the rear surface of the display 151 in parallel. The touch pad 135 may have a size equal to or smaller than that of the display 151.

The mobile terminal according to one embodiment of the present invention is configured such that a writing input to the display unit is possible while a predetermined voice is input. In addition, when a voice recognition mode is activated, the controller recognizes a voice input through the microphone and extracts letters matched to the writing input that is output to the display unit, from letters that are voice-recognized. Then, input-recommended information relating to remaining letters to be added to the writing input that is output to the display unit is generated in constant units based on the extracted letters and is output to the display unit.

In addition, in one embodiment of the present invention, the phrase "extract letters matched" means "remember letters matched," or "distinguish letters matched from other letters." In addition, the phrase "remaining letters to be added to the writing input" means "letters that remain when writing-input letters are excluded from letters that are voice-recognized." In addition, "input information relating to remaining letters" means "information that is necessary to complete one sentence."

Figure 3:
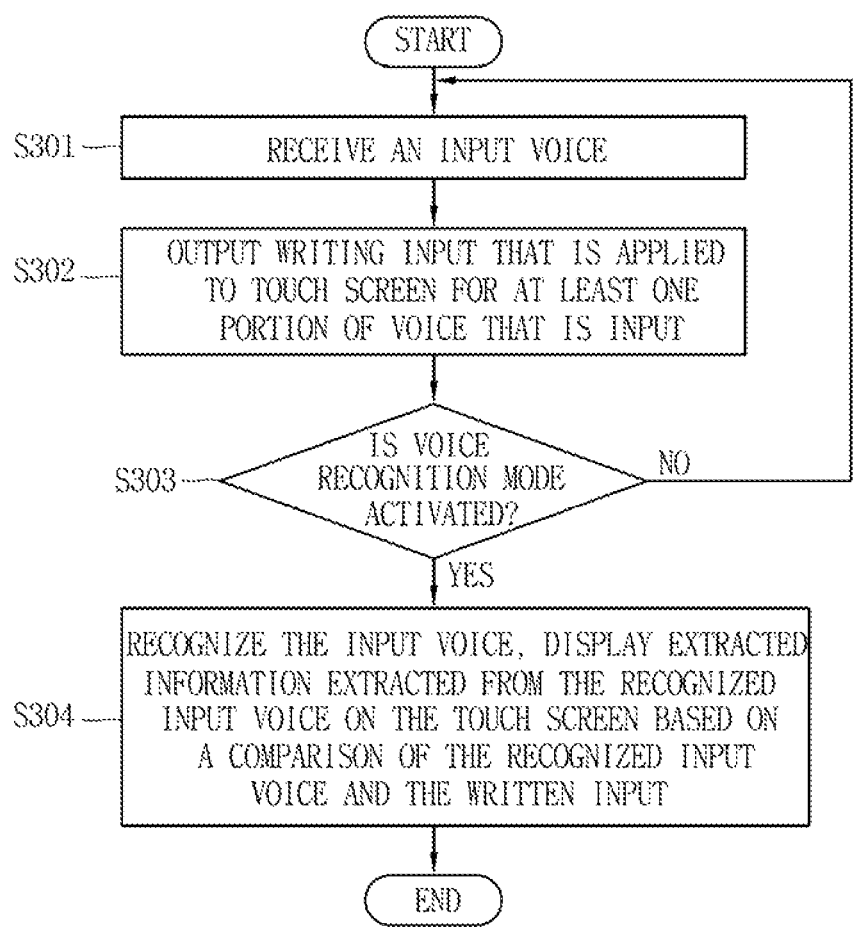
FIG. 3 is a flowchart illustrating a method of adding voice-recognized letters to a writing input in the mobile terminal according to one embodiment of the present invention.

A method of outputting the letters that are voice-recognized to the display unit, based on the writing input by the user, is described in detail below referring to the accompanying drawings. In particular, FIG. 3 is a flowchart illustrating a method of adding voice-recognized letters to the writing input in the mobile terminal according to one embodiment of the present invention. Further, FIGS. 4A to 4D are diagrams illustrating the flowchart in FIG. 3 and for a method of outputting added letters to the display unit.

Referring to FIG. 3, first, a predetermined voice is input through the microphone 122 (S301). Further, the predetermined voice is a voice of the other party during a voice telephone call, a voice output through the audio output unit 153 of the mobile terminal 100, or a voice generated from the outside. In addition, the predetermined voice includes voices of multiple human beings being input at the same time.

While the voice is input in this manner, the user can write about at least one portion of the voice input on the display unit 151. That is, while the voice is input, the writing input by the user is output to the display unit 151 (S302). Further, the writing input allows the user to record an item relating to at least one portion of the voice being input on the display unit 151 to memorize content of the voice. The writing input includes text, an image, or a combination of both. That is, the writing input includes a letter, a number, a symbol, a picture, an image, and the like.

In addition, the writing input is performed with a touch using a tool such as a user's finger, a stylus pen, or the like. Further, the writing input is input into and is output to an arbitrary region in the display unit 151. For example, the writing corresponding to the voice is input into and is output to a memo pad corresponding to a memo function application. If screen information corresponding to execution of the memo function application is output to the display unit 151, an icon for executing a speech-to-text (STT) function is displayed. In addition, for example, the writing corresponding to the voice may be input into and be output to a locked screen on which the input of a control command to an application is limited and an idle screen.

In this instance, the controller 180 recognizes the writing-input letters that are output to the display unit 151. Specifically, if the touch (or writing) to the display unit 151 has a unique pattern, the controller 180 identifies the unique pattern and thus recognizes the writing-input letters. For example, in order to recognize letters, the controller 180 determines which case the user uses in applying the inputting to the display unit 151, among when a trace of a touch is drawn, in one direction (for example, a straight line that is drawn in the upward direction and a straight line that connects in the upward direction), when a change in the trace of the touch occurs in a predetermined direction (for example, a clockwise circular trace), and when a predetermined shape is drawn or a predetermined straight or circular line or a combination of them is drawn).

In addition, while the voice is input through the microphone 122, the controller 180 detects that the voice recognition mode is activated (S303). That is, the controller 180 determines whether or not the speech-to-text function is activated.

Further, the activation of the voice recognition mode is done through the input of a predetermined key. For example, the speech-to-text function is activated when the user pushes down a specific key provided in the mobile terminal 100 or when the user touches on a soft key displayed on the display unit 151, or is activated with operation of a corresponding menu, a voice command, a predetermined wireless signal received from the outside, or a predetermined gesture input.

Figure 4:
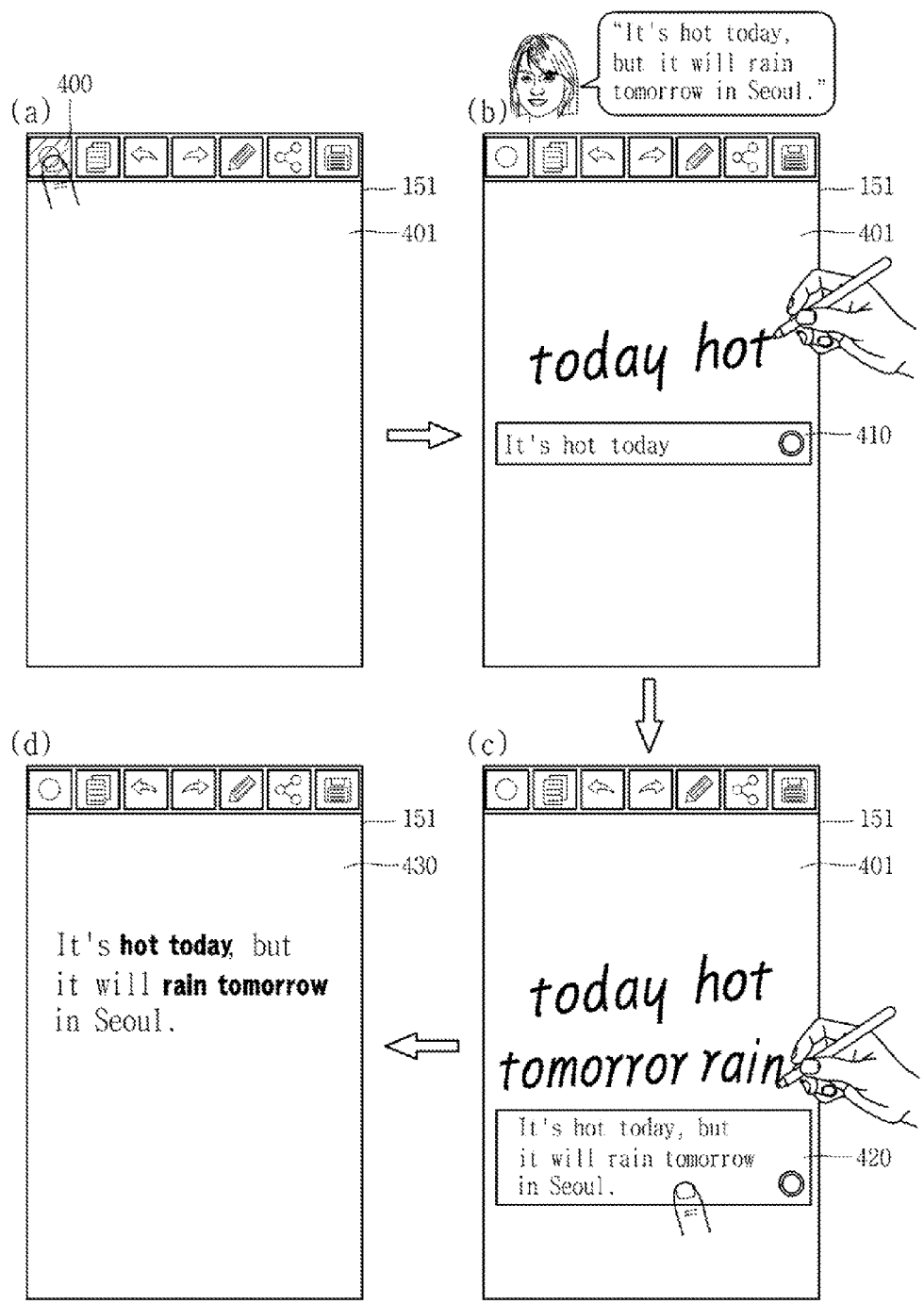
FIG. 4 is diagram illustrating the flow chart in FIG. 3 and a method of displaying added letters.

For example, as illustrated in FIG. 4(*a*), when an execution screen of the memo function application is output to the display unit 151, an icon 400 for activating the speech-to-text function is displayed on at least one region of the display unit, for example, an upper menu region. When the user short-touches or long-touches on the icon 400, the speech-to-text function is activated. If the speech-to-text function is activated in this manner, a shape (for example, a color, an appearance, a size, and transparency) of the icon 400 is changed and thus the speech-to-text function is externally recognized as activated. In addition, when the icon 400 is again short-touched or long-touched when the speech-to-text function is activated, an activated state of the voice recognition mode is terminated.

In addition, if a predetermined condition is satisfied, the activation of the voice recognition mode is automatically performed. The predetermined condition includes, for example, a condition that a predetermined voice signal is input into the microphone 122 when the execution screen of the memo function application is output. In addition, the predetermined condition includes, for example, a condition that the voice input through the microphone 122 is at a given level or above. In this instance, when the voice is not input for a predetermined time, the controller 180 terminates an activated state of the voice recognition mode or temporarily interrupts the voice recognition mode.

In addition, the voice recognition mode may be in the activated state before the voice input step S301 and the writing input step S302 described above are performed and may be activated while at the same time performing the voice input step S301 or while at the same time performing the writing input step S302.

When the voice recognition mode is activated in this manner, the controller 180 recognizes the voice input through the microphone 122 using a voice recognition algorithm. Further, a voice recognition process is performed in constant units. For example, the voice recognition is performed in word, syllable, or sentence units. When the voice input is interrupted for a predetermined time, the voice recognition process is set to be immediately performed. Then, the letters that are voice-recognized in this manner are converted into text and are displayed on one region of the display unit 151.

In addition, the voice recognition process may be set to be performed on all the voices that are input, and be set to be partly performed on only the voice that exceeds a predetermined value. In this instance, "voice recording function" is performed on the letters with low recognizability in order for the user to listen to the recording at a later time.

In addition, in the voice recognition process, when a user's pronunciation is not clear and thus one portion of the voice input is not correctly voice-recognized, the controller 180 corrects the letters that are voice-recognized, based on the writing-input letters or asks whether or not to correct the letters that are voice-recognized. When based on the writing-input letters, the speech-to-text function is executed in this manner, an effect of improving letter recognizability is obtained as well.

Then, the controller 180 compares content that is voice-recognized, with the writing input. Specifically, the controller 180 extracts the letters matched to the writing input that is output to the display unit 151, from the letters that are voice-recognized. Further, in response to the voice being input, the process of recognizing the voice and the process of making a match to the writing input are performed in real time.

That is, while the voice recognition is performed, a new voice is input in real time and the writing input by the user is continuously performed. Accordingly, according to the embodiment of the present invention, the voice recognition process and the matching process are performed in constant units (for example, syllable, word, or sentence units).

As a result of comparing the content being voice-recognized with the writing input in this manner, the input-recommended information including information relating to the content being voice-recognized and the writing input is output to the display unit 151 (S304). Specifically, when the letters matched to the writing input are extracted from the letters that are voice-recognized, the controller 180 generates in constant units the input-recommended information relating to the remaining letters to be added to the writing input, based on the extracted letters.

Further, among the letters that are voice-recognized, the input-recommended information includes at least one or more of positional information on the writing-input letters, correction information on the writing-input letters, information on the remaining letters excluding the writing-input letters, and marking information for distinguishing the writing-input letters from the remaining letters excluding the writing-input letters.

In addition, the correction information on the writing-input letters includes information as to whether a typographical error, a word spacing error, and an input order error are present in at least one portion of the writing input matched to the voice-recognized letters, and correction information relating to these errors.

Further, the controller 180 converts the letters being voice-recognized into text in constant units such as sentence units.

In addition, the controller 180 makes the text that results from the conversion pop up on one region of the display unit 151 so the text does not overlap the writing input.

For example, referring to FIGS. 4(*b*) and 4(*c*), when the execution screen of the memo function application is output, as the user performs the writing to the display unit 151 using the stylus pen while listening to a voice generated from the outside, "today hot" and "tomorrow rain" are continuously output, along a trace of the touch, to the display unit 151. Along with this, the voice heard is voice-recognized in constant units, for example, comma "," units or sentence "." units and is converted into text.

For example, when "It's hot today" is voice input through the microphone 122, "It's hot day" that is voice-recognized is converted into text, text 410 "It's hot today" that results from the conversion pops up on one region of the display unit 151. In addition, when "but it will rain tomorrow in Seoul" is voice-input into the microphone 122, "but it will rain tomorrow in Seoul" that is voice-recognized is converted into text, text "but it will rain tomorrow in Seoul" that results from the conversion is added in real time to the popping-up text 410 and is displayed.

Further, pop-up windows 410 and 420 are displayed on a region different from the region to which the writing input is output, so not to prevent the writing input by the user. In one example, when a sentence popping on one region of the display unit 151 is selected, the controller 180 can insert at least one portion of the selected sentence into a region to which the writing input is output, based on the generated input information.

Further, the selection of the popping-up sentence is performed by a touch input applied to a specific key provided in the main body, or by a predetermined touch input such as a short touch input, a long touch input, or a predetermined-direction flicking touch input, that is applied to a region on which a sentence is displayed, In addition, in one example, if at least one portion of the selected sentence is inserted into the display unit 151, the controller 180 can replace the writing-input letters that are output to the display unit 151 with the letters in the selected sentence. In addition, the controller 180 controls the display unit 151 so the replacement letters are distinguished from the other letters in the selected sentence.

To do this, the controller 180 performs control so the replacement letters are changed in a different shape from that of the other letters in the selected sentence (for example, a text size or a color is changed) or so a highlighting effect (for example, a flickering effect or a transparency-adjusting effect) is output on the replacement letters.

For example, referring to FIG. 4(*c*) and FIG. 4(*d*), when the user performs the touch input on the region on which the text 420 is displayed, the corresponding text 420 is inserted into a position or a region to which the writing input is output. Further, as illustrated in FIG. 4(*d*), "today hot tomorror rain" created by the user is replaced with the letters in the text 420, and an error "tomorror" in the writing input created by the user or letters not clearly voice-recognized are corrected and displayed.

Further, the letters "hot today rain tomorrow" that corresponds to the writing input are displayed in bold type so they are visually distinguished from the other letters "It's but it will in Seoul." An emphasizing effect is applied to the keyword letters input by the user so the keyword letters can be recognized at first glance.

The addition of the voice-recognized remaining letters to the already-output writing input that remains displayed may compete one sentence, based on the positional information on the writing-input letters, the correction information on the writing-input letters, and the information on the remaining letters excluding the writing-input letters, in the input-recommended information generated by the controller 180, that is, among the letters that are voice-recognized.

In addition, if information on a font, a size, and spacing of writing-input letters is included in the input information, the remaining letters are output with their font, size, and spacing being similar to those of the writing-input letters. Further, the order in which the writing is applied in the writing input or an error in the writing input is changed or corrected based on the popping-up text.

In addition, in one example, when the sentence (or text) that pops on the one region of the display unit 151 is not selected for a predetermined time (for example, 2 seconds), the controller 180 can pop up a next sentence that is voiced-recognized when the corresponding sentence is made to disappear from the display unit 151 or is maintained. Further, the sentences that are not selected are stored in the memory 160, and according to a predetermined control command, are recommended at a time or are output to the display unit 151.

In addition, the writing input by the user and the insertion of the letters that are voice-recognized are repeated, and thus, there occur cases where a space for the writing input or a space for inserting letters that are voice-recognized are insufficient on the display unit 151. For example, if a region of the display unit 151 to which letters are output exceeds a predetermined ratio or if a region to which letters are not output is at a reference value or below, the controller 180 determines that the space for the writing input is insufficient.

As one example, when it is determined that the space for the writing input is insufficient or when the touch input in a first direction (for example, in the outward direction from within a region to which the writing input is applied) is detected, the controller 180 can adjust the size of the already-output letters to secure a memo space.

As another example, when it is determined that the space for the writing input is insufficient on the display unit 151, or when it is detected that the touch input in a second direction (for example, a flicking touch input from right (left) to left (right)) is applied to the display unit 151, the controller 180 can display a new memo page on the display unit 151 while outputting a page-turning effect.

When the space for the writing input is secured in this manner, the steps described above, that is, the step of writing-inputting and outputting the voice input (S302) and the step of additionally inserting the letters that are voice-recognized into the writing input (S304) are repeatedly performed.

As described above, according to the embodiments of the present invention, a portion that the user incorrectly writes about the content of the telephone conversation or the content of the outside-generated voice is automatically compensated for by executing the speech-to-text function to complete a sentence, and this provides the user with a convenient environment.

Figure 5:
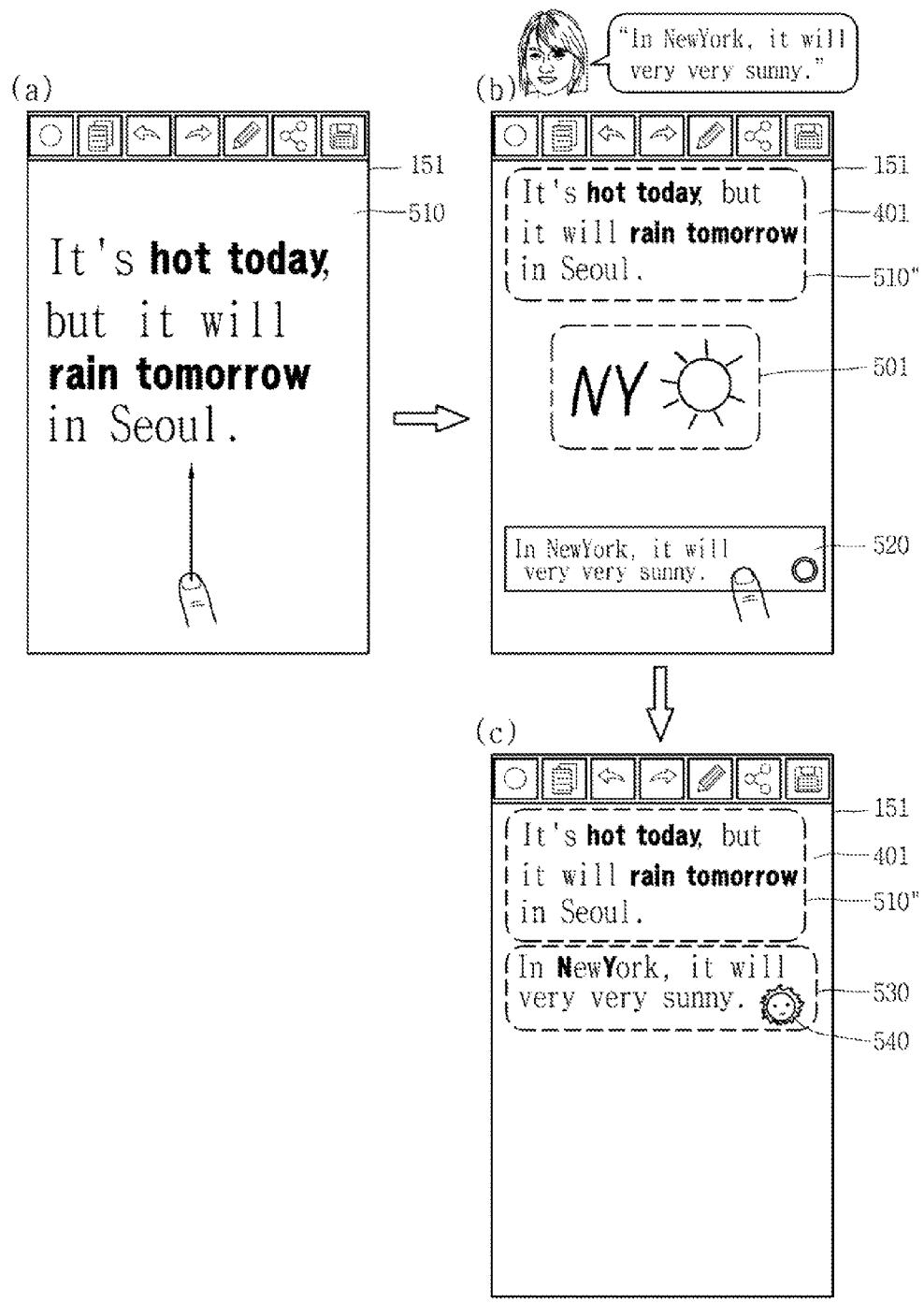
FIG. 5 is diagram illustrating a method of processing the writing input that is not matched to the voice-recognized letters in the mobile terminal according to the one embodiment of the present invention.

A method is described below in which if the writing-input letters include text or an image that is not matched to the letters that are voice-recognized, the voice-recognized letters are output. In more detail, FIG. 5 includes diagrams illustrating the method of processing the writing input that is not matched to the voice-recognized letters in the mobile terminal according to the one embodiment of the present invention.

In the mobile terminal 100 according to an embodiment of the present invention, while a predetermined voice is input through the microphone 122 when the speech-to-text function is activated, the input associated with the voice, which results from the user applying the writing to the display unit 151, is output to the display unit 151.

The controller 180 recognizes the voice input, converts the result into text, and makes the text pop up on the display unit 151. Then, when a selection signal for adding the text that results from the conversion is detected, that text is set to be output considering the writing input. To do this, the controller 180 matches the writing-input letters and the voice-recognized letters, and extracts the letters corresponding to the writing input from the voice-recognized letters.

In addition, if the writing input is a string of letters or an image that is associated with content of the voice input through the microphone 122, but is not matched to the letters that are voice-recognized, the processing is performed as follows. As one example, the controller 180 can maintain the writing-input letters that are not matched to the letters that are voice-recognized, as it is output.

Further, a position to which the corresponding letters are output is determined according to positions to which the preceding letters and the succeeding letters that are matched to the letters that are voice-recognized are output. As another example, the controller 180 can replace the writing-input letters and the image, which are not matched to the letters that are voice-recognized, with an image that is already registered with the terminal.

Further, a replacement image is selected according to the extent to which the replacement image is similar in shape or writing pattern to the corresponding letters. Specifically, if a picture image is included in the writing input that is output to the display unit 151, in response to the selection of the voice-recognized sentence that pops on the display unit 151, the controller 180 detects an emoticon that is similar in shape to the picture image through a search of the memory 160 or a web search and replaces the picture image with the detected emoticon.

For example, in FIG. 5(a), the user applies the flicking touch input to the region to which the writing input is not applied because of the insufficiency of the writing input space on the display unit 151, in one direction, that is, in the upward direction, writing-input letters 510 are adjusted in size and are output to the display unit 151 (510"). If the space for the writing input is secured in this manner, as illustrated in FIG. 5B, the user adds writing input 501 associated with a voice "In New York, it will very very sunny" input.

A voice-recognized sentence 520 "In New York, it will very very sunny" pops up on one region of the display unit 151 so the voice-recognized sentence 520 does not overlap the writing input by the user while the voice is input. Further, a proper punctuation mark, for example, a comma "," a period "." or the like is added to the popping-up sentence 520 according to the extent to which the voice input is interrupted and a voice tone.

When the user selects the popping-up sentence 520, as illustrated in FIG. 5(c), at least one portion of the popping-up sentence is output to the display unit 151, considering the writing-input letters and the image (530). Specifically, among the letters that are input by the user, "NY" is recognized as initials of "New York" that are voice-recognized and are output in bold type so "N" and "Y" are visually distinguished from the other letters. In addition, among images that are input by the user, "a shape expressing the sun" is an image that is not matched to letters, and therefore an emoticon "sun" 540 is detected to replace this and is output to the display unit 151.

Further, the user may desire to look at a view screen to which he/she directly applies the writing while hearing the voice. In addition, the user may occasionally desire to compare a first view screen to which he/she directly applies the writing and a second view screen into which the voice-recognized letters are additionally input.

Figure 6:
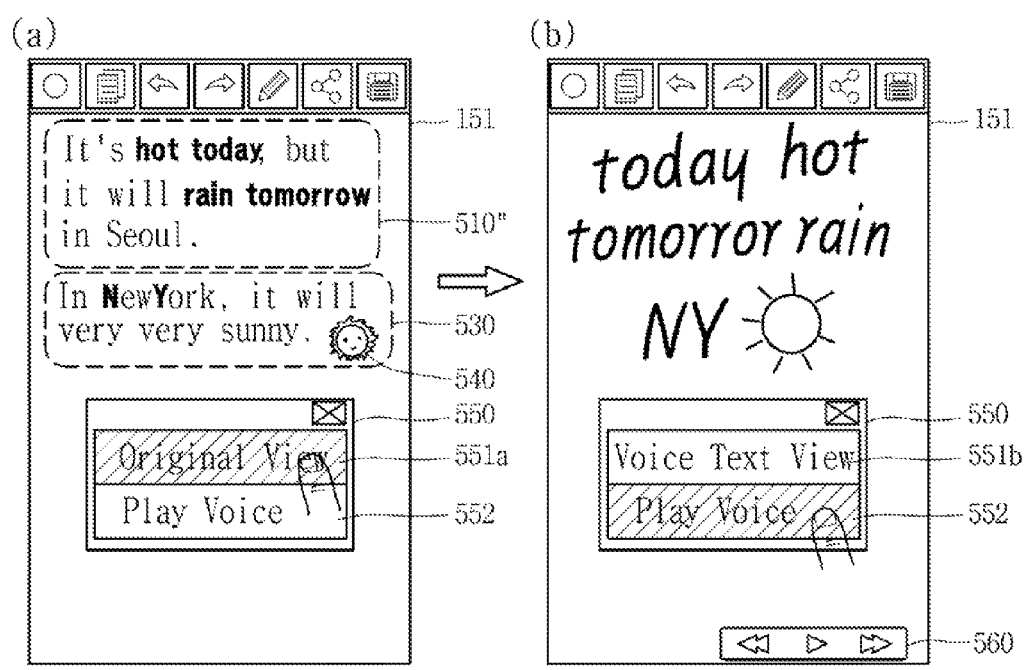
FIG. 6 is diagram illustrating a method of converting a writing input screen and a screen on which the voice-recognized letters can be added in the mobile terminal according to one embodiment of the present invention.

In addition, FIG. 6(a) and FIG. 6(b) illustrates a method of converting a writing input screen and a screen on which the voice-recognized letters can be added in the mobile terminal according to one embodiment of the present invention. When screen information in which the writing-input letters and the voice-recognized letters are input in conjunction with one another is output to the display unit 151, the control command for executing either of two modes, a first screen mode and a second screen mode that differ depending on whether or not the voice-recognized letters is added to the writing input.

For example, when the user presses or selects a specific key or touches on a region of the display unit 151, to which the writing input is applied, the controller 180 recognizes this as the control command for outputting a pop-up menu for executing a screen mode switch. Then, in response to the operation of the pop-up menu that is output, the controller 180 outputs the first screen mode or the second screen mode to the display unit 151.

Specifically, when the first screen mode is selected, the controller 180 outputs only the writing input associated with at least one portion of the voice input into the display unit 151. In addition, when the second screen mode is selected, the controller 180 outputs a screen in which at least some of the letters that are voice-recognized along with the write input associated with at least one portion of the voice input into the display unit 151 are additionally input into the writing input.

As illustrated in FIG. 6(a), when the screen information including the writing-input letters and the voice-recognized letters are displayed on the display unit 151, in response to a predetermined touch input, a menu 550 for switching a screen mode pops up on a region to which the writing input is applied. When the user selects an "Original View" key 551a from the menu 550, as illustrated in FIG. 6(b), a screen of the display unit 151 is switched to a screen including only letters that are writing-input by the user.

Further, the "Original View' key 551a is switched to a "Voice Text View" key 551b, and when the selection signal is applied from the user, the current screen is switched back to the screen in which the writing-input letters and the voice-recognized letters are input in conjunction with one another.

In addition, the control command for playing back a recording corresponding to the voice input through the microphone 122 is further input into the user input unit 130. Further, the mobile terminal according to the embodiment of the present invention assumes that the voice recording function is in the activated state while the voice is input through the microphone 122. For example, when the user presses the specific key or touches on the region of the display unit 151, to which the writing input is applied, the controller 180 recognizes this as the control command for outputting a pop-up menu for playing back the recorded voice.

Then, when the screen corresponding to either of the first and second screen modes is output, when the control command for playing back the recorded voice is input in response to the operation of the pop-up menu that is output, the controller 180 scrolls a screen that is output to the display unit 151 according to a speed at which the recorded voice is played back.

In FIG. 6(b), when the screen information in which the writing-input letters and the voice-recognized letters are displayed on the display unit 151, in response to a predetermined touch input, the menu 550 for playing back a recording corresponding to the voice input pops up on a region to which the writing input is not applied. When a "Play Voice" key 552" is selected from the popping-up menu 550, a menu icon 560 for performing playback (▶), rewinding (◀◀), or fast forwarding (▶) is displayed.

In addition, when the recorded voice is played back with the operation of the menu icon 560, a position at which the scrolling occurs or the playback currently occurs according to a speed at which the writing input that is output to the display unit 151 or the voice-recognized sentence is played back, is displayed on the screen (for example, subtitles displayed on a monitor of a karaoke machine).

Figure 7A:
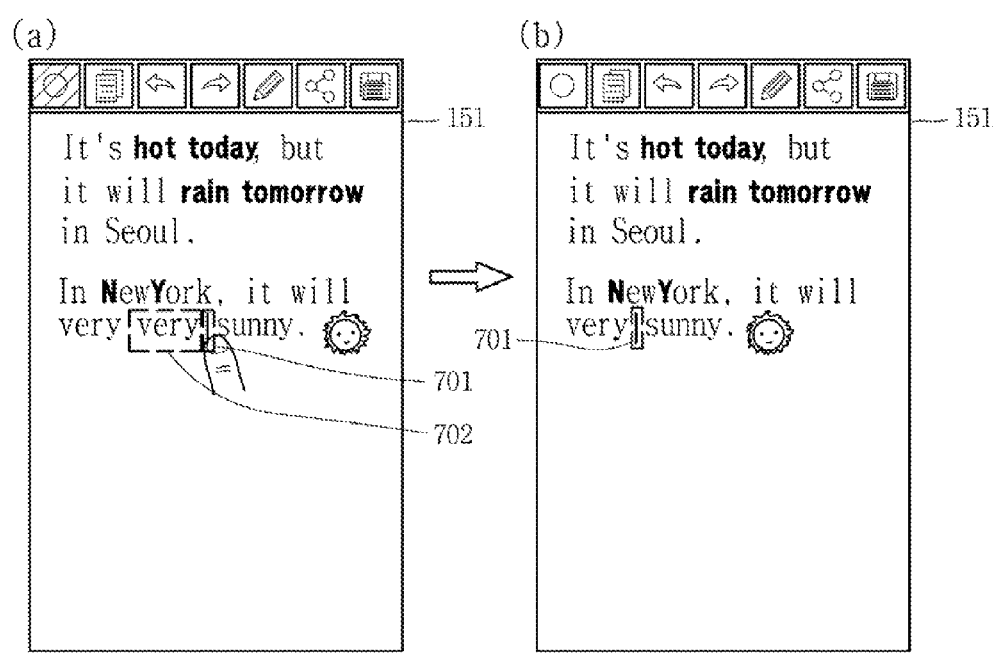
FIGS. 7A and 7B are diagrams illustrating a method of editing the writing input to which the voice-recognized letters are added in the mobile terminal according to one embodiment of the present invention.
Figure 7B:
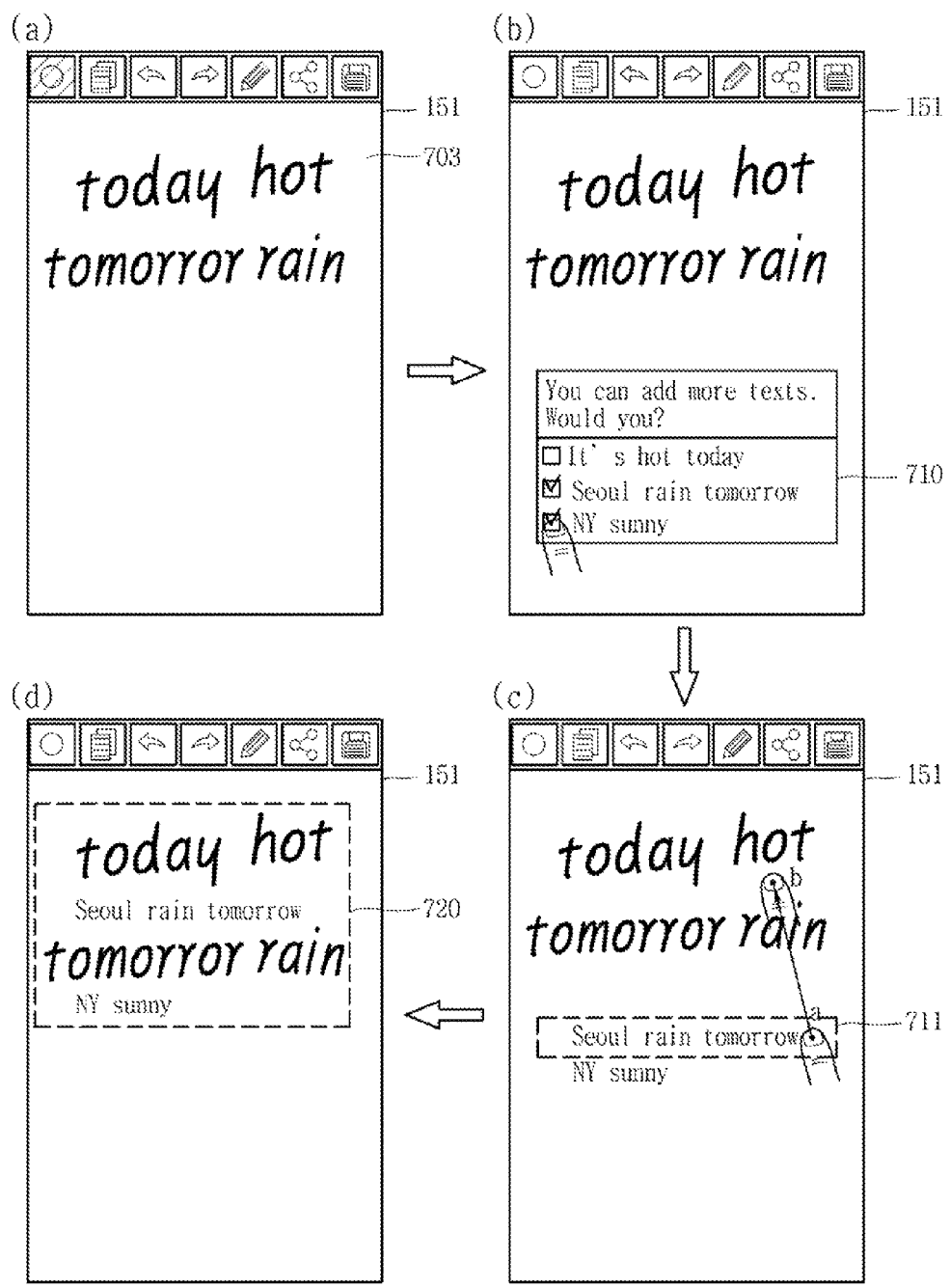
Figure 8:
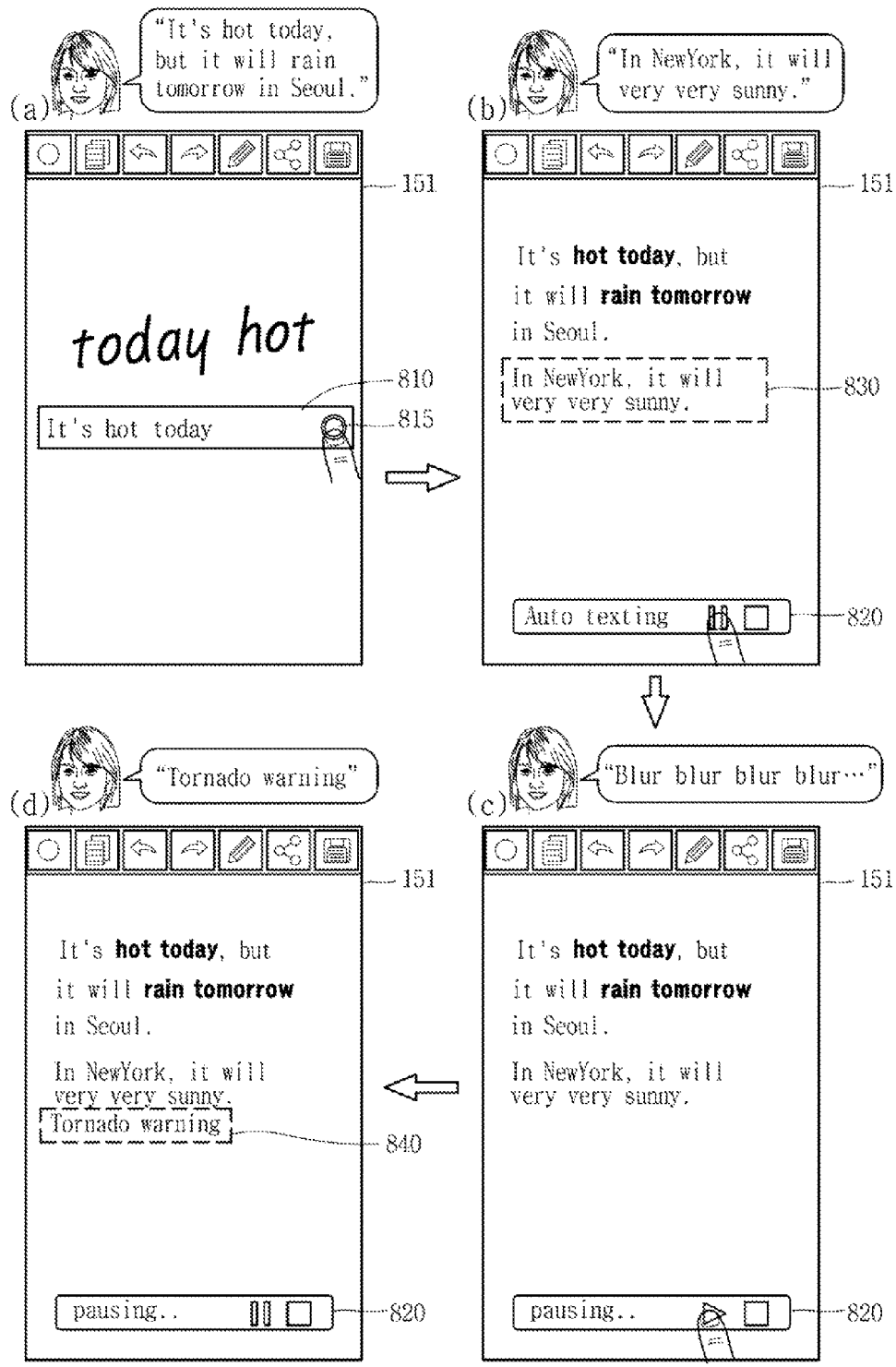
FIG. 8 is diagram illustrating a method of automatically inserting the voice-recognized letters into the writing input in the mobile terminal according to one embodiment of the present invention.

In addition, FIGS. 7 and 8 include diagrams illustrating a method of editing a screen in which the voice-recognized letters are added to the writing input in the mobile terminal according to one embodiment of the present invention.

In the display unit 151 according to the embodiment of the present invention, as described above, either a first screen mode in which only the direct writing input by the user is output or a second screen mode in which the voice-recognized letters are added based on the writing input is output according to the operation of the pop-up menu.

In this instance, when it is detected that the touch input is applied to one region of the display unit, the controller 180 enters an edit mode for editing the writing input and/or the input of the voice-recognized sentence. When the edit mode is entered in this manner, an indicator (for example, a cursor) is output to a point on the display unit 151, at which the touch input is detected.

For example, as illustrated in FIGS. 7A(a) and 7A(b), when the user applies a long touch input to a specific position on the region into which the voice-recognized sentence is inserted, for example, between "very" and "sunny, a "cursor" 701 is output as an editing guide to the corresponding position. In addition, in one embodiment, predetermined input keys can be output to a lower region of the display unit 151.

In addition, the "cursor" 701 can be moved with key operations by the user or specific letters can be input into a position that is indicated by the "cursor" in order to perform the editing. The user can also touch and drag the cursor 701. For example, the cursor 701 is dragged leftwards as much as is desired or a specific key among the input keys (e.g., a backspace or delete key) is operated in FIG. 7A(a), and thus the extra term "very" is deleted as illustrated in FIG. 7A(b). When the cursor 701 is not moved for a predetermined time (for example, five seconds), the cursor 701 disappears from the screen and at the same time, the edit mode is terminated.

In addition, in one embodiment of the present invention, even though the speech-to-text function is maintained in the activated state while a predetermined voice is input into the microphone 122, the popping up of or the recommendation of the voice-recognized sentence is realized as being performed once after the voice input is finished. Specifically, when the voice recognition mode is changed from the activated state to the inactivated state or when the recording of the voice input through the microphone 122 is finished, a list of letters that can be added to the writing input is output based on the input-recommended information (for example, the information (a position, a shape, and a space) relating to the writing-input letters, the correction information on the writing-input letters, and the information relating to the remaining letters that are voice-recognized) generated by the controller 180.

For example, in FIGS. 7B(a) and 7B(b), when the generation of the voice is finished or the speech-to-text function is in an OFF state when a screen 703 for the writing input by the user is output to the display unit 151, the letters in constant units (for example, a comma unit) that the user fails to writing-input are output in the form of a list 710. The user can select specific letters to be additionally inserted from the list 710 by marking a check box corresponding to the specific letters with "√".

When a first touch (for example, a short touch) is applied to specific letters (or a specific sentence) in the list, the controller 180 adds the specific letters to writing input. In addition, when it is detected that a second touch (for example, a long touch) is applied to the added specific letters on the display unit 151, the controller 180 arranges the specific letters at a point at which the dragging of the second touch is terminated. That is, through a drag touch input, the user can determine a position into which the selected specific letters are inserted.

For example, referring to FIGS. 7B(c) and 7B(c), when the long touch is applied to a region on which added letters "Seoul rain tomorrow" 711 are displayed, the entire letters are moved along a trace of the touch. For example, when the user moves the letters 711 from a point "a" to a point "b" with his/her finger and releases the touch, for example, a screen 720 on which the letters 711 are arranged is output to the point "b" desired by the user.

The adding of the voice-recognized letters through the selection (for example, the touch input) for a portion that the user fails to write-input is described above. A in-real-time adding of the voice-recognized letters to the writing input without the recommendation is described below.

In particular, FIG. 8 is diagram illustrating a method of automatically inserting the voice-recognized letters into the writing input in the mobile terminal according to one embodiment of the present invention. The controller 180 detects the selection of an automatic input mode in the activated state of the voice recognition mode. Further, the selection of the automatic input mode may be made by operating a specific menu key, and if a specific condition is satisfied, may be automatically made.

Further, the specific condition includes a condition that a difference in speed between the writing input and the voice input is a reference value or above, a condition that the user does not perform any writing input for a predetermined time, and a condition that a specific event (for example, a call signal arrival) occurs.

When the automatic input mode is selected in this manner, the controller 180 converts the letters that are voice-recognized into text and adds in real time the result of the conversion to the region to which the writing input is output. When the writing input is detected or the operation of the specific menu key is detected, the automatic input mode is temporarily interrupted or is terminated.

In addition, when the automatic input mode is selected in this manner, the controller 180 displays on one region of the display unit 151 an indicator icon for controlling an operational state where the letters that are voice-recognized are converted into text and the result of the conversion is added to the writing input. The user controls operation, temporal interruption, and termination of the automatic input, and an input speed of the automatic input by operating the displayed indicator icon.

For example, as illustrated in FIG. 8(a), a specific key 815 for switching to the automatic input mode is displayed on a region on which a voice-recognized sentence 810 pops up. When the user touches on the corresponding key 815 as illustrated in FIG. 8(b), a sentence 830 that is voice-recognized is input in real time and an indicator icon 820 for controlling the operational state of the automatic input mode is displayed on a lower portion of the display unit 151.

When the user touches on a key corresponding to "temporal interruption" when the voice-recognized sentences are automatically inserted into the display unit 151, execution of the automatic input is temporarily interrupted. Further, the voice-recognized sentence that is addable pops up on one region of the display unit 151. In addition, in FIGS. 8(*c*) and 8(*d*), when the user touches on a key corresponding to "operation" on the indicator icon 820 in a "temporal interruption" state of the automatic input, a sentence "Tornado warning" 840 that results from voice-recognizing the content of the voice that resumes being generated is output to the display unit.

In addition, when the writing input is applied by the user while the automatic input mode is executed, the controller 180 preferentially processes (outputs) the writing input by the user. In this instance, the voice-recognized sentence that is addable is switched back to a manual input mode in which the recommendation is available on the display unit 151.

In addition, as described above, while the voice is input through the microphone 122, the user may perform multitasking or a specific event may be received in the mobile terminal. In this context, referring to FIG. 9, a method of adding the voice-recognized letters to the writing input when multitasking in the mobile terminal 100 is described.

While an execution screen corresponding to the memo function application is executed in the foreground, as described above, voice-recognized sentences are inserted in real time based on the writing input applied by the user while a predetermined voice is input. In addition, even though an execution screen corresponding to a different application is output to the display unit 151 while a voice is input, the input information is continuously generated based on the writing input and the voice recognition of the voice input.

Accordingly, when a first control command is detected when a screen of the writing input corresponding to a first application (for example, the memo function application) is output to the display unit 151, the controller 180 switches the screen of the writing input to an execution screen corresponding to a second application. The controller 180 also outputs to one region of the display unit 151*a* graphic object indicating the automatic recording of the voice input.

Further, the first control command is a command in which the drag touch input starting from at least two touch points on the display unit 151 is applied in a predetermined direction when the screen of the writing input is output. In addition, when it is detected that a predetermined-type touch input is applied to the graphic object on the execution screen corresponding to the second application, the controller 180 outputs the screen of the writing input corresponding to the first application back the display unit 151. When returning to the previous screen, the controller 180 additionally inputs text letters, which correspond to the voice automatically recorded in the background while the execution screen corresponding to the second application is output, into the writing input.

Figure 9:
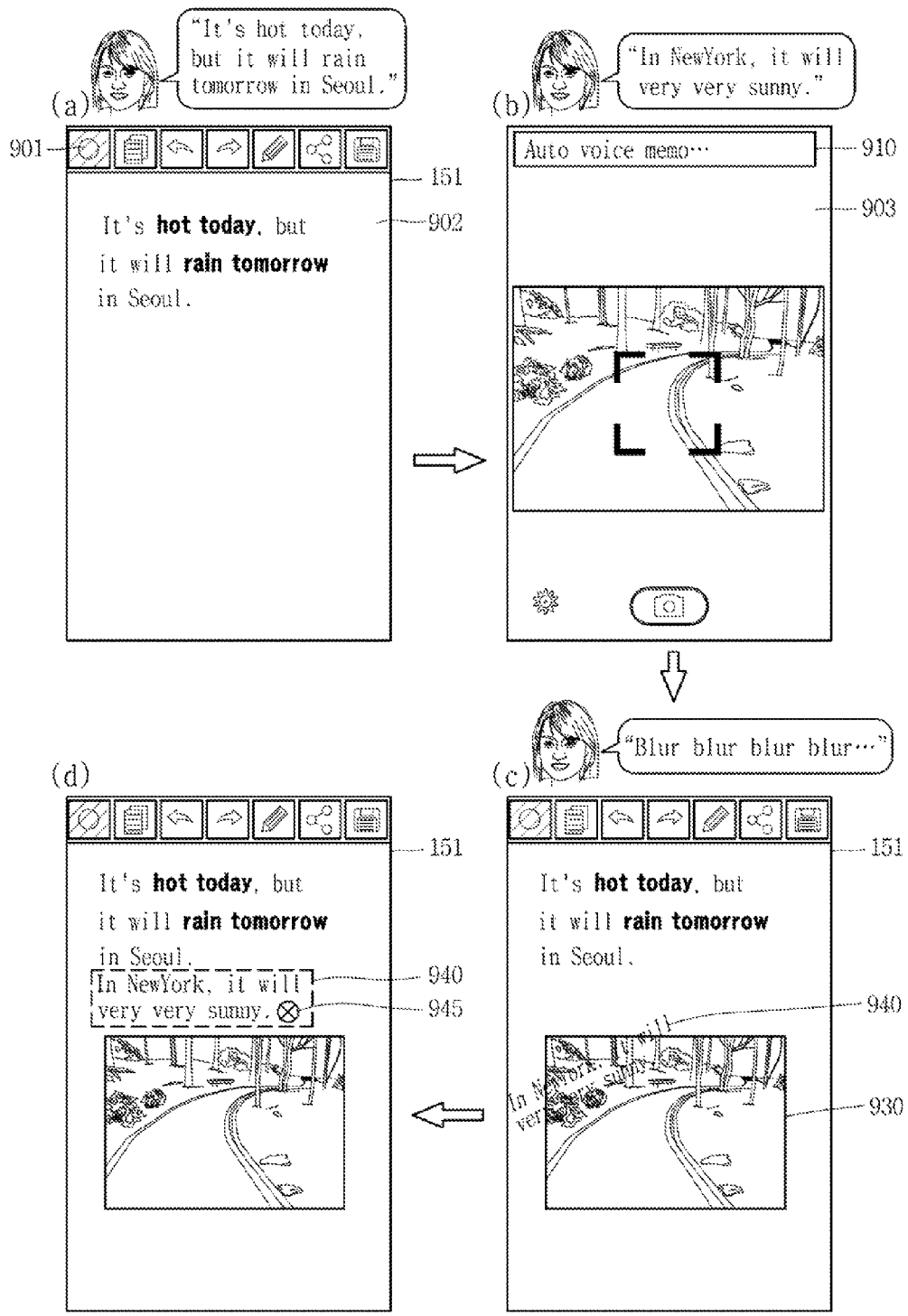
FIG. 9 is diagram illustrating a method of adding the voice-recognized letters into the writing input when executing multitasking in the mobile terminal according to one embodiment of the present invention.

For example, in FIG. 9(*a*), when a predetermined voice is output through the microphone 122, a screen 902 is displayed including the voice-recognized sentence at a position corresponding to the written input by the user on the display unit 151, and when the user applies a drag touch input starting from two touch points from right to left on the screen 902, the screen is switched to the idle screen to which multiple icons corresponding to the application are output.

When the user touches on an icon corresponding to a photograph function application on the idle screen, as illustrated in FIG. 9(*b*), the screen is switched to a preview screen 903 for camera photographing. Further, an indicator that the speech-to-text function and the voice recording function for a voice input are executed in the background is output to one region, for example, an upper region, of the display unit 151.

When the photographing is finished, the screen of the display unit 151 returns back to the screen corresponding to the memo function application. Further, as illustrated in FIG. 9(*c*), a captured image 930 is copied to be pasted or is imported as an attachment. In addition, when returning to the screen corresponding to the memo function application occurs, the sentences that are voice-recognized in the meantime are additionally inserted at a time, and at the same time a specific animation effect (for example, a rotating and flying effect) is output to the voice-recognized sentence.

In addition, as illustrated in FIG. 9(*d*), a key "X" 945 for canceling insertion is displayed within a region on which an added sentence 940 is displayed, and the already-inserted sentence is deleted with the touch by the user. Further, if a predetermined event occurs when the screen of the writing input is output (for example, a call signal arrival), the controller 180 distinguishes between the voice received and the voice generated from the outside (multiple microphones 122 may be provided to do this) and executes in the background the recording function and the speech-to-text function for the voice that is generated from the outside are executed.

Further, the controller displays an indication of this background execution on one region of the display unit 151. In addition, when a telephone conversation is finished, even though the touch is not applied to the indication, the automatic returning the previous screen of the writing input occurs.

Figure 10:
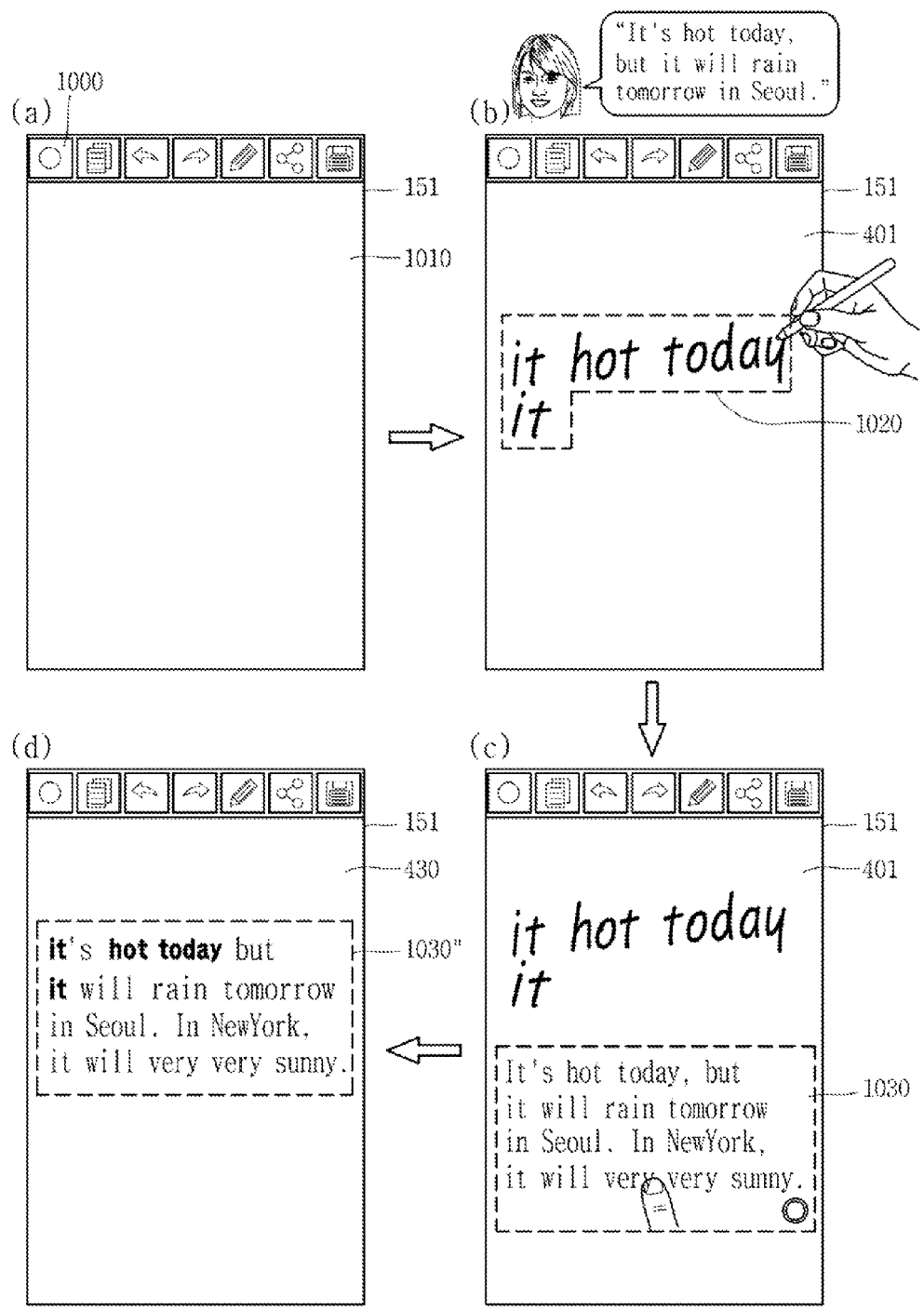
FIG. 10 is diagram illustrating a method in which the voice-recognized letters are added to the writing input, based on a speed of the writing input in the mobile terminal according to one embodiment of the present invention.

Referring to FIG. 10, an embodiment is described below in which a recommendation of the voice-recognized sentence is made based on the speed of the writing input. In this context, FIG. 10(*a*) to FIG. 10(*d*) are diagrams illustrating a method in which the voice-recognized letters are added to the writing input, based on the speed of the writing input in the mobile terminal according to one embodiment of the present invention.

According to the embodiments described above, the letters that are voice-recognized in the activated state of the voice recognition mode are recommended in constant units to the display unit 151 or are inserted in real time into the display unit 151 through an automatic input function. In addition, if the letters that voice-recognized in this manner are recommended to the display unit 151 or are inserted into the display unit 151, this prevents the writing input by the user.

Accordingly, in order to minimize the writing input by the user being prevented, when a predetermined voice is input through the microphone 122, the activated state of the speech-to-text function is continuously maintained, the writing input is preferentially is output in ordinary times. Furthermore, when a predetermined condition is satisfied or is not satisfied, the letters that are voice-recognized are recommended or are inserted.

Specifically, when it is determined that the speed of the writing input applied to the display unit 151 is lower by a predetermined range or above than the input speed of the voice input through the microphone 122, the automatic input function in which the letters that are voice-recognized are converted into text and are added in real time to the writing input is set to be executed. That is, in ordinary times, only the writing input is displayed on the display unit 151, and any indication or pop-up is not performed for the voice-recognized letters. However, only when the speed condition described above is satisfied, the switching to the input mode that allows the automatic input function is made.

When the execution screen of the memo function application it output as illustrated in FIG. 10(*a*), the user listens to the content of the outside-generated voice and can perform writing input 1020 on one portion of the content or a specific word. In addition, when the content of the outside-generated voice input is compared with the speed of the writing input 1020 and the matched letters and as a result it is determined that a predetermined range is exceeded, that is, that the writing input speed of the user is higher than the speed of the outside-generated voice, a sentence 1030 that results from voice-recognizing the content of the outside-generated voice is recommended to the display unit 151 as illustrated in FIG. 10(*c*) or a step illustrated in FIG. 10(*c*) is omitted.

Then, as illustrated in FIG. 10(*d*), the sentence voice-recognized in real time is additionally added to the writing input (the automatic input function). Further, the letters matched to the writing input "it hot today it" are displayed so they are visually distinguished from the other letters. In addition, a speed difference, for activating the automatic input function, between the writing input and the voice input is set or changed through the user input.

Also, a condition for activating the automatic input function may be changed to other conditions in addition to the condition that the speed difference between the writing input and the voice input is present. As an example of this, if a matching ratio of the voice-recognized letters to the letters in the writing input is less than a reference value (for example, less than 30 percent), the automatic input function is set to be activated.

Figure 11A:
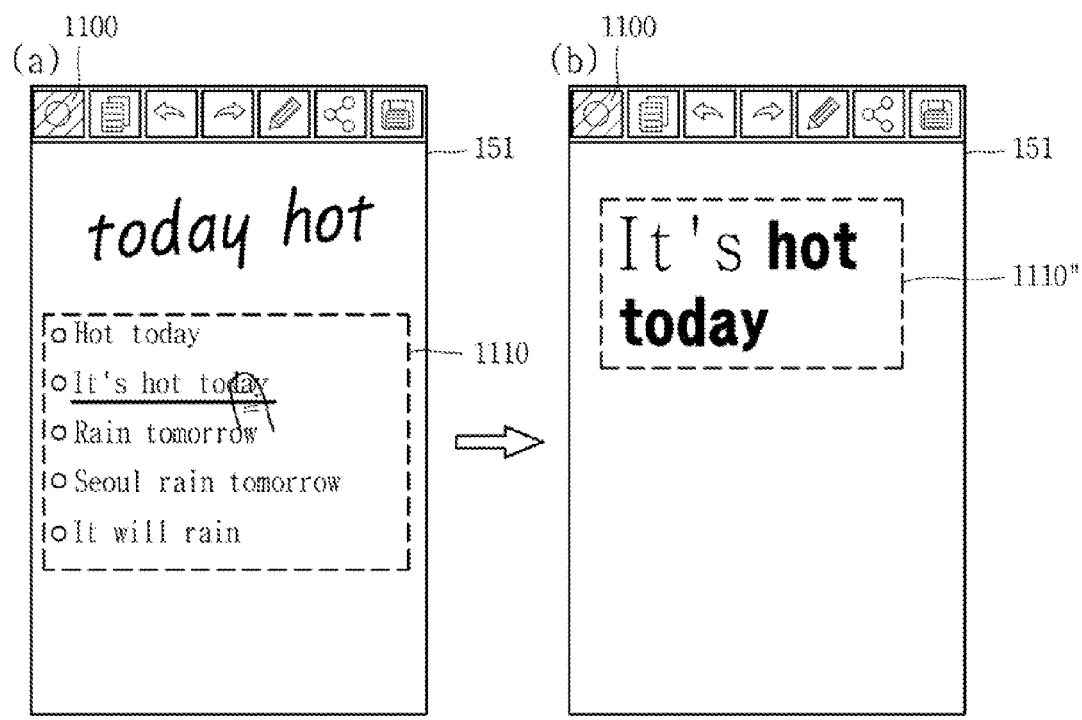
FIGS. 11A and 11B are diagrams illustrating a method of displaying a list of voice-recognized multiple addable letters in the mobile terminal according to one embodiment of the present invention.
Figure 11B:
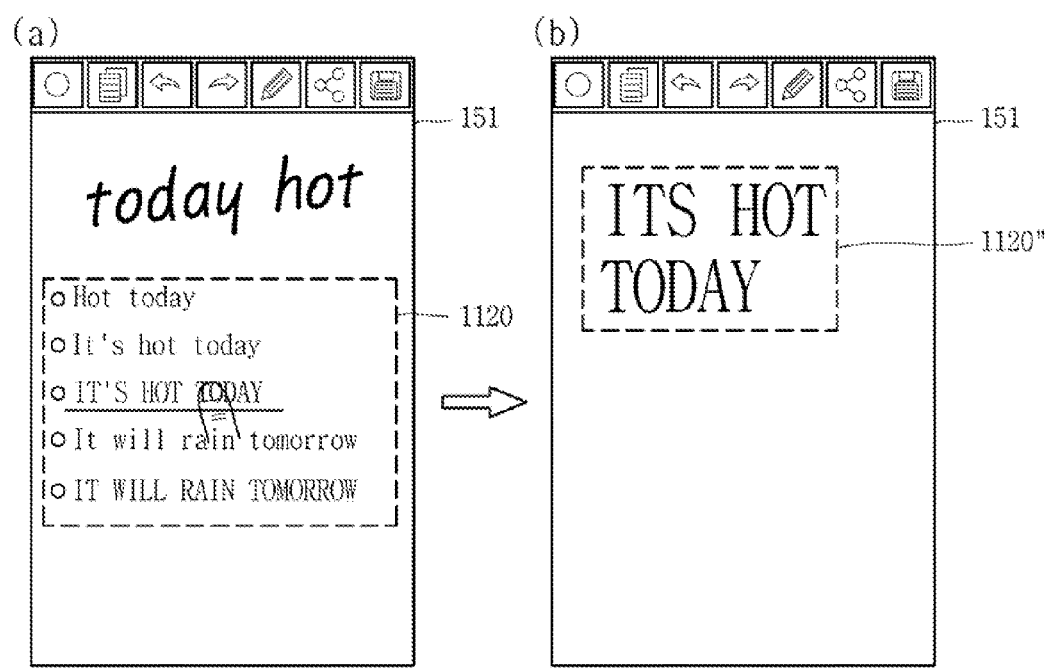

In addition, FIGS. 11A(a) to 11A(b) and FIGS. 11B(a) and 11B(b) are diagrams illustrating a method of displaying a list of voice-recognized multiple addable letters in the mobile terminal according to one embodiment of the present invention. According to an embodiment of the present invention, the letters that are recommended for the voice input through the microphone 122, by executing the speech-to-text function, are provided in various forms, based on the writing-input letters.

As one example, when the voice recognition mode is changed to the inactivated state or the recording of the voice input is finished, the controller 180 outputs the list of letters that are addable to the writing input, based on the generated input information (that is, the information relating to the letters matched to the writing-input letters and the information relating to the remaining letters that is distinguished from the letters matched, among the voice-recognized letters). Further, a recommendation priority is reflected in the letters that are output to the list.

For example, the controller 180 recommends only texts associated directly with the writing-input letters among the voice-recognized letters or recommends tests in which the voice-recognized letters are translated into a specific language. In addition, when displaying the list of multiple addable letters, the controller 180 outputs the list, reflecting the priority of addable letters therein (for example, for recommendation, the letters that are most directly related to the writing input is placed at the top of the list).

As illustrated in FIG. 11A(a), all or some of the letters that are voice-recognized are displayed, in the form of a list, on a pop-up window 1110, but the letters are displayed beginning with the letters that have the highest relevance to the writing-input letters "today hot." The user takes a look at the list reflecting the priority and can select specific letters (for example, "It's hot today").

Then, as illustrated in FIG. 11A(b), according to the input information (that is, the information relating to the letters matched to the writing input and the information relating to the remaining letters, among the voice-recognized letters), the writing-input letters "today hot" are inserted into the sentence when they are visually distinguished from the other letters "It's" (1110"). Further, when the order of the writing input ("today" is followed by "hot") is not matched to the order of the voice-recognized letters ("hot" is followed by "today"), the letters are displayed in the order in which the voice-recognized letters are input, or in a manner that complies with a grammar or with a sentence pattern.

In addition, referring to FIGS. 11B(a) and 11B(b), the voice-recognized letters that result from translating into a different language (for example, Korean or Japanese) a language (for example, English) in which the writing input is applied are output to a pop-up window 1120 illustrated in FIG. 11B(a). When the letters are selected that are translated into a specific language recommended by the user, as illustrated in FIG. 11B(b), the entire writing-input letters are replaced with the letters in the selected specific language (1120").

In addition, the recommendation priority of the letters that are output to the list is determined based on the time it takes to recognize the voice, a voice recognition ratio, frequently-selected words, frequently-generated words, and the like.

The embodiments are described above in which the letters voice-recognized in conjunction with the writing input by the user are additionally inserted. The screen on which the writing input and the voice-recognized letters are added is stored as one voice memo file, along with the voice recording. That is, in the mobile terminal 100 described in the present invention, when the additional input is completed based on the writing input described above and the input information that is generated in constant units, the voice memo file corresponding to this is generated.

Figure 12:
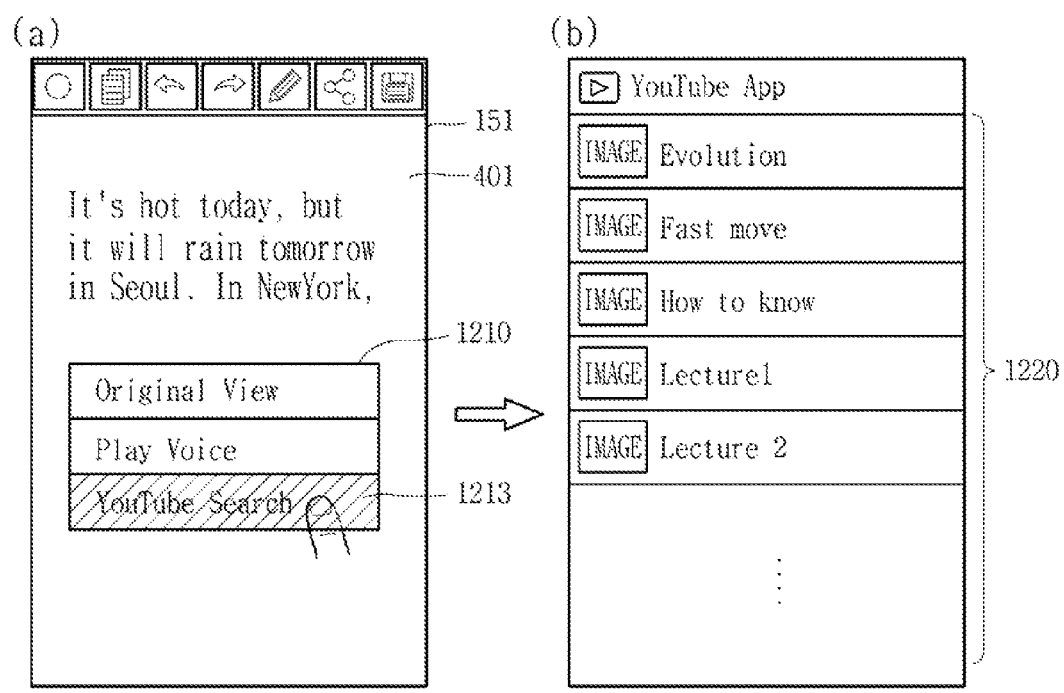
FIG. 12 is diagram illustrating a method of searching for a voice file matched to a voice memo file in the mobile terminal according to one embodiment of the present invention the mobile terminal.
Figure 13:
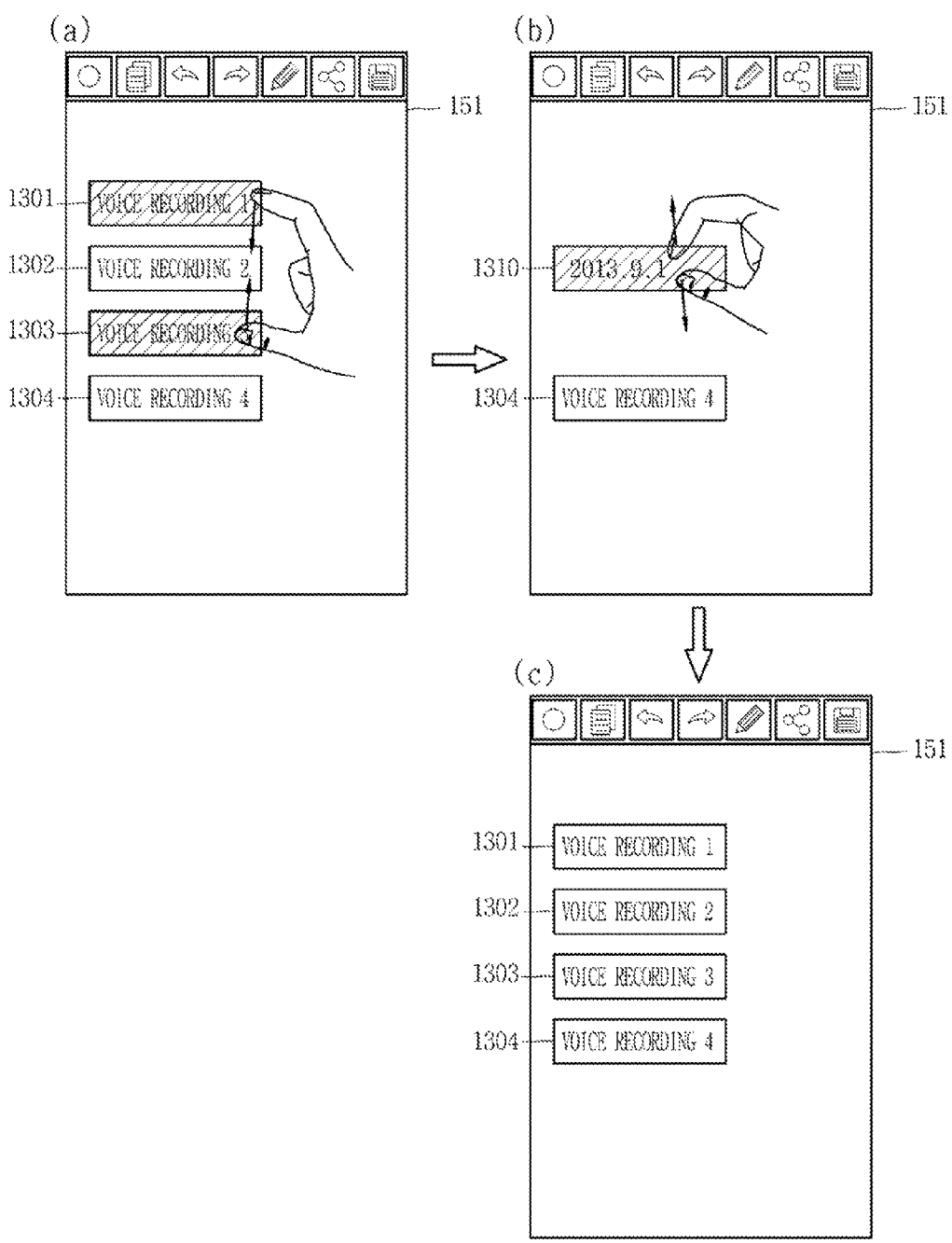
FIG. 13 is diagram illustrating a method of classifying the voice memo files and displaying the classified voice memo files to the display unit.

A method of conducting a search and a classification using the voice memo file that is generated in this manner is described below. FIG. 12 is diagram illustrating a method of searching for a voice file matched to the voice memo file in the mobile terminal according to one embodiment of the present invention, and FIG. 13 is diagram illustrating a method of classifying and displaying the voice memo files in the mobile terminal according to one embodiment of the present invention.

First, a control command for conduction an additional search associated with the voice input through the microphone 122 is input into the user input unit 130 of the mobile terminal 100 described in the present invention. In addition, the inputting of the control command is performed by operating the menu that pops up in response to the application of a predetermined touch input to the execution screen corresponding to the memo function application in the activated state of the speech-to-text function.

Further, the additional search associated with the voice input means a web search for a voice file that is recognized as being the same as the voice input in terms of a voice generator. In addition, the additional search associated with the voice input means the web search for a telephone number (when the voice of the corresponding people is stored in a telephone directory along with the telephone number) in people information corresponding to the voice input.

When the control command for executing the additional search associated with the voice input is input, the controller 180 analyses the voice input and searches the main body or conducts the web search for the voice file that is the same as the voice input in terms of a voice generator. Then, a list of voice files that result from the search are is output to the display unit 151.

For example, when a memo window 1210 from which to conduct the additional search associated with the voice corresponding to the voice memo file that is generated with the touch by the user pops on when the voice memo file is generated as illustrated in FIG. 12(*a*), the user inputs a control command for the search by touching on a "YouTube Search" key. Then, the controller 180 searches the YouTube for the voice file that is consistent with the voice that is recorded in the voice memo file and outputs a search result list 1229 to the display unit 151.

In addition, when the voice memo file is generated, the controller 180 outputs an icon corresponding to the generated voice memo file to one region of the execution screen corresponding to the memo function application. Movement, combination, separation, deletion, and the like are possible by touching on the icon that is output in this manner. Thus, the editing of the voice memo file is conveniently performed. Specifically, the controller 180 outputs an icon corresponding to the generated voice memo file to the display unit 151.

In addition, in response to the dragging of the touches applied to two points on multiple icons corresponding to the multiple voice memo files in a first direction (for example, a pinch-in or a pinch-out), depending on the extent of the dragging, the controller 180 combines the multiple icons and combines the multiple voice memo files, each corresponding to the icon, which that are present between the multiple icons (a combination range may differ depending on the extent of the dragging). In addition, the controller 180 outputs a new icon (hereinafter referred to as a "first icon") indicating the combination voice memo file to the display unit 151.

In addition, in response to the touch-dragging by the user of the first icon in a second direction (for example, a pinch-out or a pinch-in), the controller 180 divides the combination voice memo file according to the extent to which the first icon is touch-dragged. In addition, the controller 180 makes the first icon disappear and output icons corresponding to the voice memo files that results from the division.

For example, referring to FIG. 12, when the pinch-in touch is applied to an icon 1301 corresponding to a voice recording 1 and an icon 1303 corresponding to a voice recording 3 when icons 1301, 1302, 1303, and 1304 for multiple voice memo files are output to the screen, the icons 1301, 1302, and 1303 corresponding to the voice recording 1, a voice recording 2, and the voice recording 3, respectively, disappear and corresponding files are combined into one file. Then, a new icon 1310 for the resulting file is generated. As illustrated, combined time information is displayed for the generated file, but the generated file is not limited to the combined time information (for example, information on the number of combined voice memo files is displayed or information on the names of combined voice memo files is displayed).

In addition, when the user applies the pinch-out touch to the new icon 1310, as illustrated in FIG. 13(*c*), the combination voice memo file is divided based on the extent to which the pinch-out is applied. That is, the greater the distance between two touching points for the pinch-out, the greater the number of the voice memo files that result from dividing the combination voice memo file. When the combination voice memo file is divided, the icon 1310 disappears, the icons 1301, 1302, and 1303 corresponding to voice memo files that result from dividing the combination voice memo file.

As described above, according to the embodiments of the present invention, a portion that the user fails to writing-input when writing-inputs the content of the telephone conversation or the content of the outside-generated voice is automatically compensated for by executing the speech-to-text function to complete a sentence. Thus, the user convenience is improved. In addition, the content of the telephone conversation or of the outside-generated voice that is writing-input by the user and the content of the telephone conversation or of the outside-generated voice that is inserted by executing the speech-to-text function are displayed in a visually-distinguishable manner. Thus, the user can intuitively recognize the letters that he/she writing-inputs.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a wireless communication unit configured to perform wireless communication;
    a microphone configured to receive an input voice;
    a touch screen; and
    a controller configured to:
        receive a written touch input on the touch screen corresponding to the input voice,
        recognize the input voice while a voice recognition mode is activated,
        display extracted information extracted from the recognized input voice on the touch screen based on a comparison of the recognized input voice and the written touch input, wherein the extracted information does not overlap the written touch input,
        when the extracted information is selected, insert the extracted information into a region on which the written touch input is displayed and display next extracted information on the touch screen,
        activate an automatic input mode based on a difference in speed between the written touch input and the input voice,
        automatically insert the extracted information into the region on which the written touch input is displayed in response the activated automatic input mode, and
        inactivate the automatic input mode when the written touch input is detected in the automatic input mode.

2. The mobile terminal of claim 1, wherein the controller is further configured to display the extracted information at a position on the touch screen corresponding to the written touch input.

3. The mobile terminal of claim 2, wherein the controller is further configured to stop displaying the written touch input when the extracted information is displayed at the position on the touch screen corresponding to the written touch input.

4. The mobile terminal of claim 1, wherein the controller is further configured to:
    convert the recognized input voice into text, and
    display the text on the touch screen at a first position different than a position where the written touch input is displayed.

5. The mobile terminal of claim 4, wherein the controller is further configured to display the extracted information when receiving a selection of the displayed text.

6. The mobile terminal of claim 1, wherein portions of the written touch input corresponding to the extracted information are highlighted from other portions of the extracted information.

7. The mobile terminal of claim 6, wherein the controller is further configured to automatically correct misspelling of the portions of the written touch input and automatically add remaining letters excluded from the written touch input.

8. The mobile terminal of claim 1, wherein the controller is further configured to change information displayed on the touch screen or display a new page to secure a memo space for receiving the written touch input.

9. The mobile terminal of claim 1, wherein when the written touch input includes a written picture, the controller is further configured to display an emoticon that is similar in shape to the written picture image with the extracted information displayed on the touch screen.

10. The mobile terminal of claim 1, wherein the controller is further configured to:
switch between a first screen mode and a second screen mode based on a predetermined input, and
wherein the first screen mode displays only the written touch input and the second screen mode displays both the written touch input and text of the recognized input voice.

11. The mobile terminal of claim 10, wherein the controller is further configured to:
display a playback display option for playing back a recording of the input voice, and
scroll the written touch input in the first screen mode and scroll the written touch input and the text of the recognized input voice in the second screen mode according to a speed at which the recorded voice is played back.

12. The mobile terminal of claim 1, wherein the controller is further configured to enter an edit mode and output an indicator indicating an input position to a point at which a predetermined touch input is detected.

13. The mobile terminal of claim 1, wherein when the voice recognition mode is changed to an inactivated state or recording of the voice input is finished, the controller is further configured to:
display a list of characters that can be added to the written touch input, and
add selected characters from the list of characters to the written touch input at a position corresponding to a touch and drag from the selected characters to the written touch input.

14. The mobile terminal of claim 1, wherein when an automatic input function is selected the voice recognition mode is activated.

15. The mobile terminal of claim 1, wherein when a first control command is detected when a screen of the written touch input corresponding to a first application is displayed on the touch screen, the controller is further configured to:
switch the screen of the written touch input to an execution screen corresponding to a second application, and
display a graphic object indicating that recording of the voice input is in progress on one region of the touch screen.

16. The mobile terminal of claim 15, wherein when it is detected that a predetermined-type touch input is applied to the graphic object, the controller is further configured to:
display the screen of the written touch input corresponding to the first application back on the touch screen, and
insert characters corresponding to the voice input recorded while the execution screen corresponding to the second application is displayed into a region to which the written touch input is displayed.

17. The mobile terminal of claim 1, wherein when the controller determines a speed of the written touch input applied on the touch screen is higher or lower by a predetermined range than an input speed of the voice, the controller is further configured to:
execute the automatic input mode in which the recognized input voice is converted into text, and
add the text to a region to which the written touch input is displayed.

18. The mobile terminal of claim 1, wherein the controller is further configured to:
receive a control command for executing an additional search associated with the voice input,
analyze the voice input,
search a memory associated with the mobile terminal or conduct a web search for a voice file that matches the voice input, and
display a list of found voice files on the touch screen.

19. A method of controlling a mobile terminal, the method comprising:
receiving, via a microphone, an input voice;
receive, via a touch screen, a written touch input corresponding to the input voice;
recognizing, via a controller, the input voice while a voice recognition mode is activated; and
displaying, via the controller, extracted information extracted from the recognized input voice on the touch screen based on a comparison of the recognized input voice and the written touch input, wherein the extracted information does not overlap the written touch input;
when the extracted information is selected, inserting the extracted information into a region on which the written touch input is displayed and displaying next extracted information on the touch screen;
activating an automatic input mode based on a difference in speed between the written touch input and the input voice;
automatically inserting the extracted information into the region on which the written touch input is displayed in response the activated automatic input mode; and
inactivating the automatic input mode when the written touch input is detected in the automatic input mode.

20. The method of claim 19, further comprising:
displaying the extracted information at a position on the touch screen corresponding to the written touch input.

* * * * *